US010261573B2

(12) United States Patent
Sunwoo et al.

(10) Patent No.: US 10,261,573 B2
(45) Date of Patent: Apr. 16, 2019

(54) POWER CONTROL METHOD AND APPARATUS FOR REDUCING POWER CONSUMPTION

(71) Applicant: Samsung Electronics Co., Ltd., Suwon-si (KR)

(72) Inventors: Seunghui Sunwoo, Suwon-si (KR); Junyun Kim, Yongin-si (KR); Seongeun Kim, Hwaseong-si (KR); Jungsik Park, Suwon-si (KR); Heungsik Shin, Jeonju-si (KR); Jinwoo Kim, Seoul (KR); Hyunju Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/947,774

(22) Filed: Nov. 20, 2015

(65) Prior Publication Data

US 2016/0147292 A1 May 26, 2016

(30) Foreign Application Priority Data

Nov. 21, 2014 (KR) ........................ 10-2014-0163599

(51) Int. Cl.
*G06F 1/32* (2006.01)
*G06F 1/3296* (2019.01)
(Continued)

(52) U.S. Cl.
CPC .......... *G06F 1/3296* (2013.01); *G06F 1/1616* (2013.01); *G06F 1/1647* (2013.01);
(Continued)

(58) Field of Classification Search
CPC ..... H04W 52/02; H04W 52/04; H04W 52/00; H04W 28/08; H04W 36/22; H04W 4/00;
(Continued)

(56) References Cited

U.S. PATENT DOCUMENTS 8,269,754 B2 9/2012 Nagata
8,806,235 B2 * 8/2014 Deakin ................. G06F 1/3265 345/1.1
(Continued)

FOREIGN PATENT DOCUMENTS

EP 2479967 A1 7/2012
JP 5495814 3/2014
(Continued)

OTHER PUBLICATIONS

Communication with partial European Search Report dated Apr. 6, 2016 corresponding to European Patent Application No. 15195679.4.
(Continued)

*Primary Examiner* — Jean A Gelin
(74) *Attorney, Agent, or Firm* — Jefferson IP Law, LLP

(57) ABSTRACT

Provided are a method and apparatus for controlling at least part of one or more functions of an electronic device so as to reduce power consumption. According to various embodiments, the electronic device may perform operations of identifying the number of one or more displays functionally connected with the electronic device, executing at least part of one or more functions of the one or more displays in a first power consumption mode if the number of one or more displays is singular, and executing at least part of one or more functions of the one or more displays in a second power consumption mode if the number of one or more displays is plural.

18 Claims, 15 Drawing Sheets

(51) Int. Cl.
*G06F 1/16* (2006.01)
*G06F 1/3218* (2019.01)
*G06F 1/3234* (2019.01)
*G06F 1/3231* (2019.01)
*G06F 1/3215* (2019.01)

(52) U.S. Cl.
CPC .......... *G06F 1/1677* (2013.01); *G06F 1/1694* (2013.01); *G06F 1/3215* (2013.01); *G06F 1/3218* (2013.01); *G06F 1/3231* (2013.01); *G06F 1/3265* (2013.01); *Y02D 10/153* (2018.01); *Y02D 10/173* (2018.01)

(58) Field of Classification Search
CPC .. H04W 52/027; G06F 1/1616; G06F 1/1647; G06F 1/3215; G06F 1/3218; G06F 1/3265; G06F 1/3296
USPC ................................ 455/522, 13.4, 566, 572
See application file for complete search history.

(56) References Cited

U.S. PATENT DOCUMENTS

2003/0156074 A1* 8/2003 Ranganathan ........ G06F 1/3203 345/1.1
2005/0140567 A1* 6/2005 Ishizu .................. G06F 3/1431 345/1.3
2007/0103434 A1* 5/2007 Lian ..................... G06F 3/1423 345/156
2008/0291169 A1* 11/2008 Brenner ............... G06F 1/1626 345/168
2009/0070606 A1 3/2009 Chen et al.
2010/0293402 A1 11/2010 Marinkovic et al.
2010/0302219 A1* 12/2010 Kitashou .............. G06F 3/1431 345/204
2010/0317408 A1 12/2010 Ferren et al.
2010/0328331 A1* 12/2010 Iwaki .................... G09G 3/003 345/547
2011/0172984 A1 7/2011 Cher et al.
2011/0199310 A1 8/2011 Oakley
2011/0234617 A1 9/2011 Watanabe
2011/0316840 A1* 12/2011 Hirata .................. G06F 1/3231 345/211
2012/0176353 A1 7/2012 Ishii
2012/0299980 A1 11/2012 Fujikawa
2012/0319965 A1 12/2012 Kurabayashi et al.
2013/0117591 A1* 5/2013 Enomoto .............. G06F 1/3231 713/320
2013/0127725 A1* 5/2013 Sugimoto ................ G06F 3/02 345/168
2013/0328796 A1* 12/2013 Al-Dahle ................ G06F 3/041 345/173
2013/0329239 A1* 12/2013 Hikichi .............. H04N 1/00384 358/1.9
2013/0335348 A1 12/2013 Nam et al.
2014/0033061 A1* 1/2014 Teng .................... G06F 3/1415 715/744
2014/0104242 A1* 4/2014 Muntianu ................ G06F 3/14 345/204
2014/0189395 A1 7/2014 Kp
2014/0210691 A1* 7/2014 Yamashita ........... G06F 3/1423 345/1.3
2014/0232731 A1 8/2014 Holland et al.
2014/0253564 A1 9/2014 Redman et al.
2015/0100802 A1* 4/2015 Thomas ................ G06F 1/3265 713/320
2015/0194124 A1* 7/2015 Yamauchi ........... H04M 1/6083 345/211
2016/0042707 A1* 2/2016 Wang .................. G09G 3/2044 345/214

FOREIGN PATENT DOCUMENTS

KR 20130140450 12/2013
KR 20140008845 1/2014
WO 2013/073256 A1 5/2013

OTHER PUBLICATIONS

International Search Report dated Mar. 14, 2016 corresponding to International Patent Application No. PCT/KR2015/012497.
Communication with extended European Search Report dated Jul. 26, 2016 corresponding to European Application No. 15195679.4-1959.

* cited by examiner

POWER CONTROL METHOD AND APPARATUS FOR REDUCING POWER CONSUMPTION

CROSS-REFERENCE TO RELATED APPLICATION(S)

This application claims the benefit under 35 U.S.C. § 119(a) of a Korean patent application filed on Nov. 21, 2014, in the Korean Intellectual Property Office and assigned Serial number 10-2014-0163599, the entire disclosure of which is hereby incorporated by reference.

BACKGROUND

Various embodiments of the present disclosure relate to a method and apparatus for reducing power consumption in an electronic device including one or more displays.

Nowadays a great variety of electronic devices are used for offering many kinds of information to end-users. In such electronic devices, information may be visually offered on one or more displays. Additionally, since there are various types of available displays, the electronic device may offer such information in various forms to end-users. This may enhance user's convenience. Further, the electronic device may offer a touch-sensitive or gesture-based input mechanism through one or more displays functionally connected thereto.

As the performance of the electronic device (e.g., a smart phone) advances, the electronic device may further offer information to end-users through another display. For example, using two or more displays (e.g., touch screens having different touch-sensitive panels), the electronic device may offer various contents (e.g., movie, image, message, etc.) to end-users. However, as the number of displays functionally connected with the electronic device increases, power consumption of such displays may be also increasing.

SUMMARY

Various embodiments disclosed herein relate to a reduction, or saving, of power consumption in an electronic device, especially in one or more displays which are located inside and/or outside of the electronic device and are functionally connected with the electronic device.

According to an embodiment, a method performed by an electronic device may include identifying the number of one or more displays functionally connected with the electronic device; if the number of one or more displays is singular, executing at least part of at least one or more functions of the one or more displays in a first power consumption mode; and if the number of one or more displays is plural, executing at least part of at least one or more functions of the one or more displays in a second power consumption mode.

DETAILED DESCRIPTION

Figure 1:
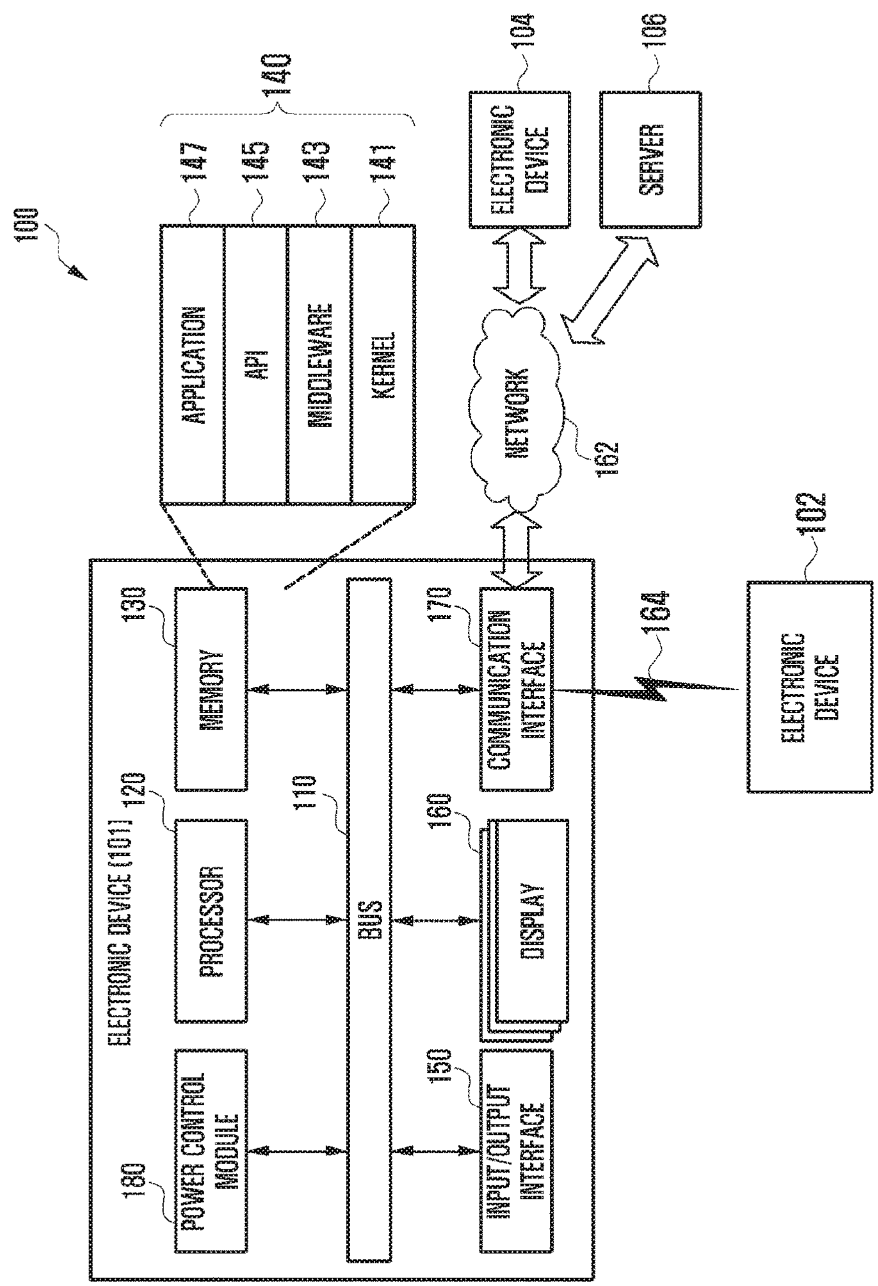
FIG. 1 is a schematic diagram illustrating a network environment including an electronic device according to various embodiments.

The present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term “include” or “may include” which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as “include” or “have” may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

In various embodiments of the present disclosure, the expression “or” or “at least one of A or/and B” includes any or all of combinations of words listed together. For example, the expression “A or B” or “at least A or/and B” may include A, may include B, or may include both A and B.

The expression “1”, “2”, “first”, or “second” used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device may indicate different user devices although both of them are user devices. For example, without departing from the scope of the present disclosure, a first structural element may be referred to as a second structural element. Similarly, the second structural element also may be referred to as the first structural element.

When it is stated that a component is “coupled to” or “connected to” another component, the component may be directly coupled or connected to another component or a new component may exist between the component and another component. In contrast, when it is stated that a component is “directly coupled to” or “directly connected to” another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, and a wearable device (e.g., a Head-Mounted-Device (HMD) such as electronic glasses; electronic clothes; an electronic bracelet; an electronic necklace; an electronic accessory; an electronic tattoo; and a smart watch).

According to some embodiments, the electronic device may be a smart home appliance having a communication function. The smart home appliance may include at least one of a television (TV), a Digital Video Disk (DVD) player, an audio player, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and an electronic frame.

According to some embodiments, the electronic device may include at least one of various types of medical devices (e.g., Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (e.g., a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term “user” used in various embodiments may refer to a person who uses an electronic device or a device (e.g., an artificial intelligence electronic device) which uses an electronic device.

FIG. 1 illustrates a network environment 100 including an electronic device 101 according to various embodiments of the present disclosure. Referring to FIG. 1, the electronic device 101 may include various components including a bus 110, a processor 120, a memory 130, an input/output interface 150, a display 160, a communication interface 170, and a power control module 180.

The bus 110 may be a circuit connecting the above described components and transmitting communication (e.g., a control message) between the above described components.

The processor 120 may receive commands from other components (e.g., the memory 130, the input/output interface 150, the display 160, the communication interface 170, or the power control module 180) through the bus 110, analyze the received commands, and execute calculation or data processing according to the analyzed commands.

The memory 130 stores commands or data received from the processor 120 or other components (e.g., the input/output interface 150, the display 160, the communication interface 170, or the power control module 180) or generated by the processor 120 or other components. The memory 130 may store a software and/or a program 140. For example, the program 140 may include a kernel 141, middleware 143, an Application Programming Interface (API) 145, and an application program (or an application) 147. At least part of the kernel 141, the middleware 143 or the API 145 may refer to an operating system (OS).

The kernel 141 controls or manages system resources (e.g., the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 can be used, to the application 147.

The API 145 is an interface by which the application 147 can control a function provided by the kernel 141 or the middleware 143 and includes, for example, at least one interface or function (e.g., command) for a file control, a window control, image processing, or a character control.

According to various embodiments, the application 147 may include a Short Message Service (SMS)/Multimedia Messaging Service (MMS) application, an email application, a calendar application, an alarm application, a health care application (e.g., application measuring quantity of exercise or blood sugar) or an environment information application (e.g., application providing information on barometric pressure, humidity or temperature). Additionally, or alternatively, the application 147 may be an application related to an information exchange between the electronic device 101 and an external electronic device (e.g., electronic device 104). The application 147 related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 101 to the external electronic device (e.g., electronic device 104). Additionally, or alternatively, the notification relay application may receive notification information from, for example, the external electronic device 104, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device or communicate with the electronic device 101, an application executed in the external electronic device 104, or a service (e.g., call service or message service) provided by the external electronic device 104.

According to various embodiments, the application 147 may include an application designated according to an attribute (e.g., type of electronic device) of the external electronic device 104. For example, when the external electronic device 104 is an MP3 player, the application 147 may include an application related to music reproduction. Similarly, when the external electronic device 104 is a mobile medical device, the application 147 may include an application related to health care. According to an embodiment, the application 147 may include at least one of an application designated to the electronic device 101 and an application received from an external electronic device (e.g., server 106 or electronic device 104).

The input/output interface 150 transmits a command or data input from the user through an input/output device 150 (e.g., a sensor, a keyboard, or a touch screen) to the processor 120, the memory 130, the communication interface 170, or the display control module 160 through, for example, the bus 110. For example, the input/output interface 150 may provide data on a user's touch input through a touch screen to the processor 120. Further, the input/output interface 150 may output a command or data received, through, for example, the bus 110, from the processor 120, the memory 130, the communication interface 170, or the power control module 180 through the input/output device (e.g., a speaker or a display). For example, the input/output interface 150 may output voice data processed through the processor 120 to the user through the speaker.

The display 160 may include, for example, liquid crystal display (LCD), organic light-emitting diode (OLED) display, microelectromechanical systems (MEMS) display, or electronic paper display. The display 160 may visually offer, for example, various contents (e.g., text, image, video, icon, symbol, etc.) to users. The display 160 may include a touch screen and receive, for example, a touch, gesture, proximity, or hovering input using an electronic pen or a user's body. According to an embodiment, the display 160 may be one or more displays. For example, the display 160 may be included in the electronic device 101 or included in an external device (e.g., the electronic device 102 or 104) having a wired or wireless connection with the electronic device 101, thus outputting information offered by the electronic device 101 to users.

According to an embodiment, the display 160 may be attachable to or detachable from the electronic device 101. For example, the display 160 may include an interface which can be mechanically or physically connected with the electronic device 101. According to an embodiment, in case the display 160 is detached (e.g., separated) from the electronic device 101 by a user's selection, the display 160 may receive various control signals or image data from the power control module 180 or the processor 120, e.g., through wireless communication.

The communication interface 170 may establish communication between the electronic device 101 and any external device (e.g., the first external electronic device 102, the second external electronic device 104, or the server 106). For example, the communication interface 170 may be connected with a network 162 through wired or wireless communication and thereby communicate with any external device (e.g., the first external electronic device 102, the second external electronic device 104, or the server 106).

According to an embodiment, the electronic device 101 may be connected with the first external electronic device 102 and the second external electronic device 104 without using the communication interface 170. For example, based on at least one of a magnetic sensor, a contact sensor, a light sensor, and the like that is equipped in the electronic device 101, the electronic device 101 may sense whether at least one of the first and second external electronic devices 102 and 104 is contacted with at least part of the electronic device 101, or whether at least one of the first and second external electronic device 102 and 104, respectively, is attached to at least part of the electronic device 101.

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. Wired communication may include, for example, at least one of USB (universal serial bus), HDMI (high definition multimedia interface), RS-232 (recommended standard-232), POTS (plain old telephone service), and the like. The network 162 may include telecommunication network, for example, at least one of a computer network (e.g., LAN or WAN), internet, and a telephone network.

The first and second external electronic devices 102 and 104 may be identical to, or different from, the electronic device 101. According to an embodiment, the first and second external electronic devices 102 and 104 may include, for example, a plurality of electronic devices. According to an embodiment, the server 106 may include a single server or a group of servers. According to various embodiments, all or part of operations executed in the electronic device 101 may be executed in other electronic device(s), such as the first and second electronic devices 102 and 104 or the server 106.

According to an embodiment, in case the electronic device 101 is required to perform a certain function or service automatically or by request, the electronic device 101 may request another device (e.g., the electronic device 102 or 104 or the server 106) to execute instead, or additionally at least part, of at least one or more functions associated with the required function or service. The requested device may execute the requested function and deliver the result of execution to the electronic device 101. Then, the electronic device 101 may offer the required function or service, based on the received result or by processing the received result. For the above, cloud computing technology, distributed computing technology, or client-server computing technology may be used, for example.

The power control module 180 may process at least part of information obtained from other elements (e.g., the processor 120, the memory 130, the I/O interface 150, the display 160, the communication interface 170, etc.) and, through this, may offer various contents of other elements (e.g., the application program 147, the application programming interface 145, etc.). For example, the power control module 180 may perform various operations (e.g., adjusting or regulating luminance, brightness, power, etc.) for controlling electric power of the at least one display 160.

For example, the power control module 180 may vary electric current consumption of the electronic device 101, based on the number of displays 160 functionally connected with the electronic device 101 and activated. In this case, if the display that offers information under the control of the electronic device 101 is singular, the power control module 180 may execute the at least one or more functions of the display 160 in the first power consumption mode (e.g., a normal mode or a default mode of the electronic device 101). Otherwise, if such displays are plural, the power control module 180 may perform the at least one or more functions of the display 160 in the second power consumption mode (e.g., a low power consumption mode having smaller current consumption than that of the normal mode). A further description about the power control module 180 will be made below with reference to FIG. 4.

Figure 2:
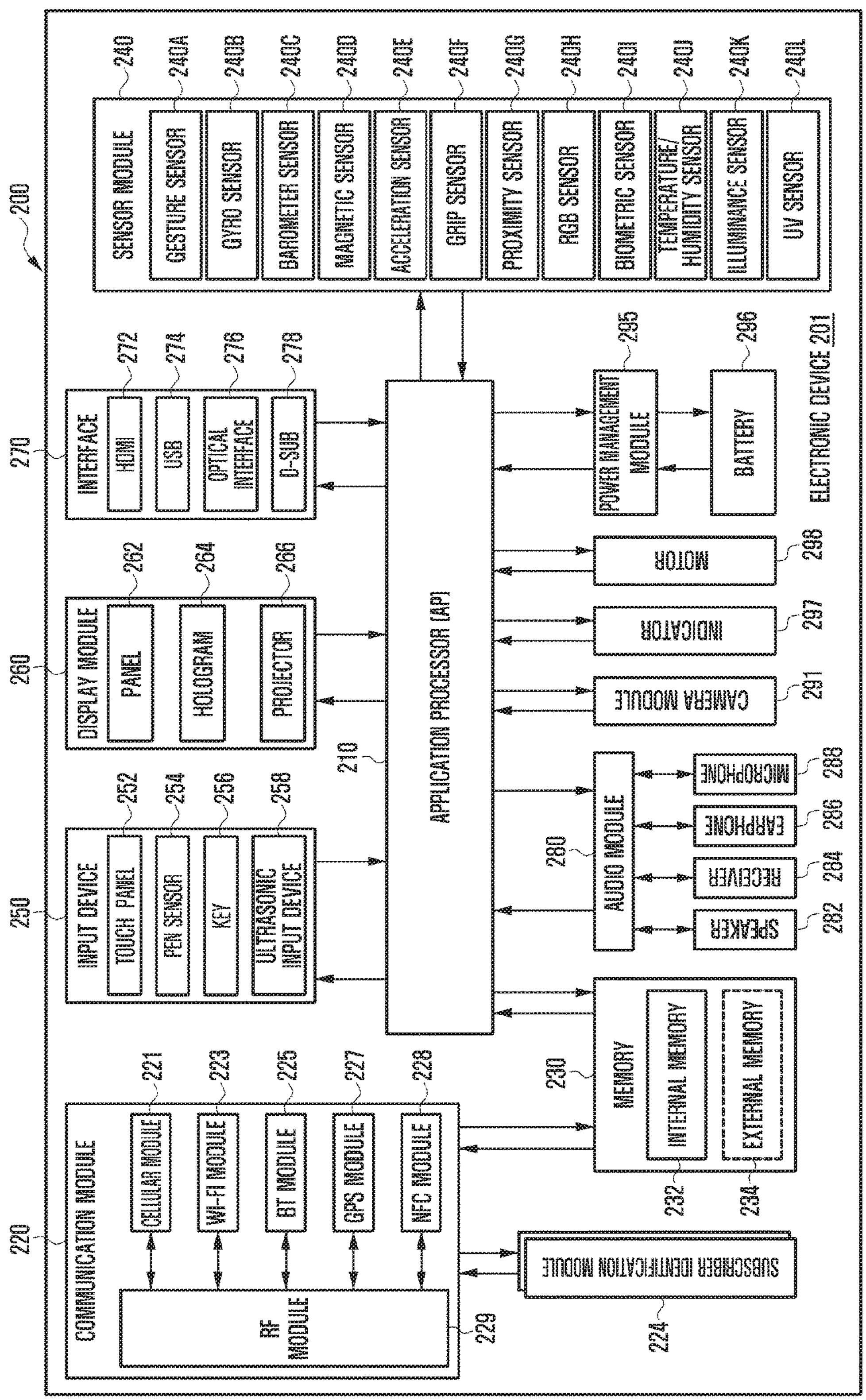
FIG. 2 is a schematic block diagram illustrating an electronic device according to various embodiments.

FIG. 2 is a block schematic diagram 200 of an electronic device 201 according to various embodiments of the present disclosure. The electronic device 201 may configure, for example, a whole or a part of the electronic device 101 illustrated in FIG. 1. Referring to FIG. 2, the electronic device 201 includes one or more Application Processors (APs) 210, a communication module 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the processor 210 may further include a Graphic Processing Unit (GPU).

The communication module 220 (e.g., communication interface 170) transmits/receives data in communication between different electronic devices (e.g., the electronic device 104 and the server 106) connected to the electronic device 201 (e.g., electronic device 101) through a network. According to an embodiment, the communication module 220 includes a cellular module 221, a Wi-Fi module 223, a Bluetooth (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or an Internet service through a communication network (e.g., Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (e.g., the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC Although the components such as the cellular module 221 (e.g., Communication Processor), the memory 230, and the power management module 295 are illustrated as components separate from the AP 210 in FIG. 2. The AP 210 may include at least some (e.g., cellular module 221) of the aforementioned components in an embodiment.

According to an embodiment, the AP 210 or the cellular module 221 (e.g., Communication Processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are illustrated as blocks separate from each other in FIG. 2, at least some (e.g., two or more) of the cellular module 221, the Wi-Fi module 223, the BT module 225, the GPS module 227, and the NFC module 228 may be included in one Integrated Chip (IC) or one IC package according to one embodiment. For example, at least some (e.g., the communication processor corresponding to the cellular module 221 and the Wi-Fi processor corresponding to the Wi-Fi module 223) of the processors corresponding to the cellular module 221, the Wi-Fi module 223, the BT module 225, the GPS module 227, and the NFC module 228 may be implemented by one SoC The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment.

The SIM card 224 is a card including a Subscriber Identification Module and may be inserted into a slot formed in a particular portion of the electronic device 201. The SIM card 224 includes unique identification information (e.g., Integrated Circuit Card Identifier (ICCID)) or subscriber information (e.g., International Mobile Subscriber Identity (IMSI)).

The memory 230 (e.g., memory 130) may include an internal memory 232 or an external memory 234. The internal memory 232 may include, for example, at least one of a volatile memory (e.g., a Random Access Memory (RAM), a dynamic RAM (DRAM), a static RAM (SRAM), a synchronous dynamic RAM (SDRAM), and the like), and a non-volatile Memory (e.g., a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (e.g., Red, Green, and Blue (RGB) sensor) 240H, a biometric sensor 240I, a temperature/humidity sensor 240J, an illumination (light) sensor 240K, and a Ultra Violet (UV) sensor 240L. Additionally or alternatively, the sensor module 240 may include, for example, a E-nose sensor, an electromyography (EMG) sensor, an electroencephalogram (EEG) sensor, an electrocardiogram (ECG) sensor, an Infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (e.g., microphone 288) of the electronic device 201 through an input means generating an ultrasonic signal to identify data and can perform wireless recognition. According to an embodiment, the electronic device 201 receives a user input from an external device (e.g., computer or server) connected to the electronic device 201 by using the communication module 220.

The display 260 (e.g., display 160) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication interface 160 illustrated in FIG. 1. Additionally, or alternatively, the interface 270 may include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (e.g., a front sensor or a back sensor), an Image Signal Processor (ISP) (not shown) or a flash (e.g., an LED or xenon lamp).

The power management module 295 manages power of the electronic device 201. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (e.g., AP 210) of the electronic device 201, for example, a booting status, a message status, a charging status and the like. The motor 298 converts an electrical signal to a mechanical vibration.

Although not illustrated, the electronic device 201 may include a processing unit (e.g., GPU) for supporting a module TV. The processing unit for supporting the mobile TV may process, for example, media data according to a standard of Digital Multimedia Broadcasting (DMB), Digital Video Broadcasting (DVB), media flow or the like.

Each individual element set forth herein may be formed of one or more components, and the name of such an element may be varied according to types of electronic devices. In various embodiments, the electronic device may be configured to include at least one of elements set forth herein. Namely, some elements may not be included, or any other element may be further included. Additionally, some of elements included in the electronic device may be integrated into a single entity while maintaining their inherent functions.

Figure 3:
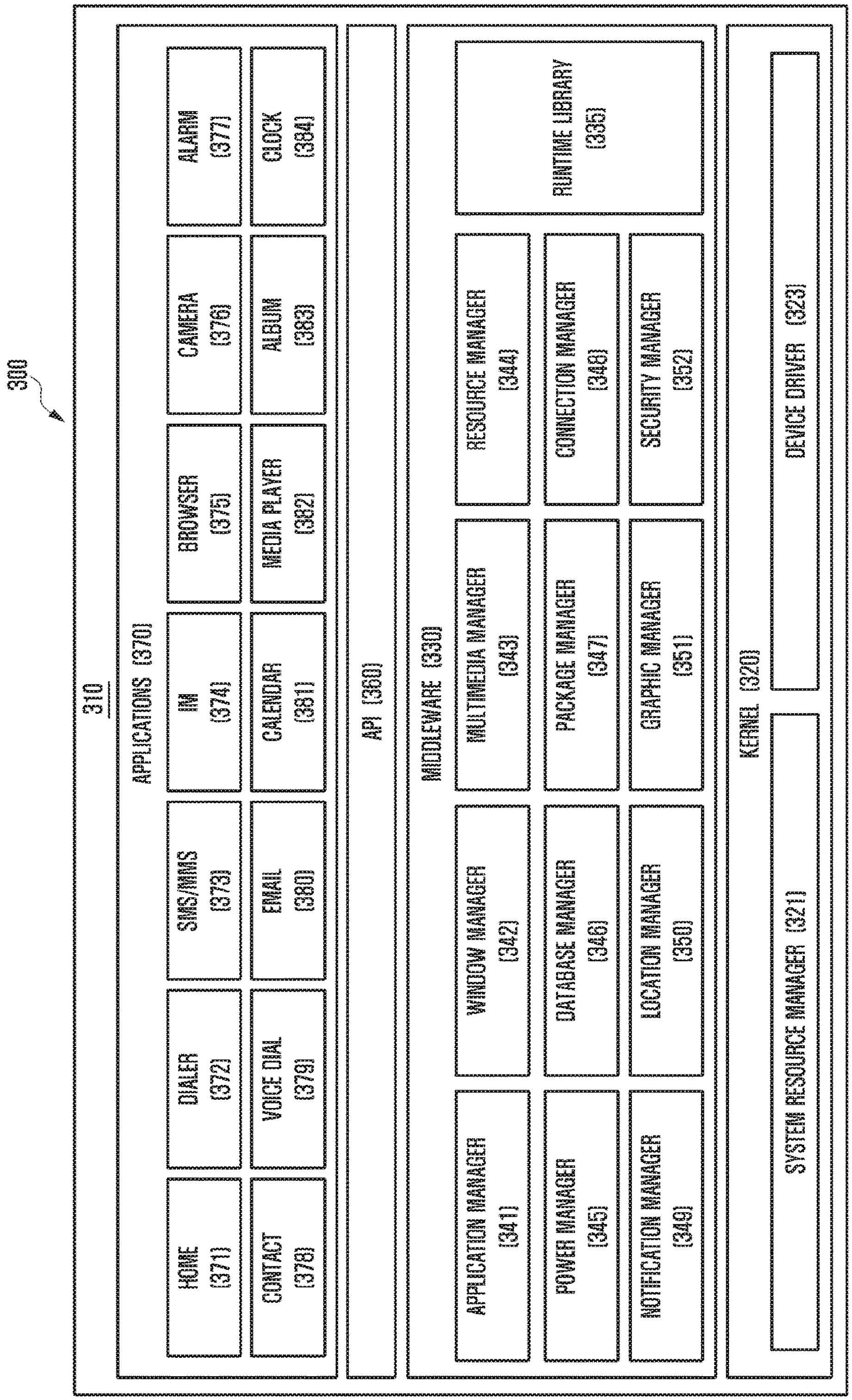
FIG. 3 is a schematic block diagram illustrating a program module according to various embodiments.

FIG. 3 is a block diagram 300 of a program module according to various embodiments. According to an embodiment, the program module 310 (e.g., the program 140) may include an operating system (OS) for controlling resources associated with an electronic device (e.g., the electronic device 101) and/or various applications (e.g., the application program 147) running on the operating system. The operating system may be, for example, Android, iOS, Windows, Symbian, Tizen, Bada, or the like.

The program module 310 may include a kernel 320, a middleware 330, an application programming interface (API) 360, and/or an application 370. At least part of the program module 310 may be preloaded on the electronic device or downloaded from an external electronic device (e.g., the electronic device 102 or 104, the server 106, etc.).

The kernel 320 (e.g., kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a Bluetooth driver, a shared memory driver, a USB driver, a keypad driver, a Wi-Fi driver, and an audio driver. Further, according to an embodiment, the device driver 323 may include an Inter-Process Communication (IPC) driver.

The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 300 (e.g., middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 includes, for example, a library module used by a complier to add a new function through a programming language while the application 370 is executed. According to an embodiment, the runtime library 335 executes input and output, management of a memory, a function associated with an arithmetic function and the like.

The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as Wi-Fi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (e.g., electronic device 101 or 201) has a call function, the middleware 330 may further include a telephony manager for managing a voice of the electronic device or a video call function.

The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (e.g., API 145) is a set of API programming functions, and may be provided with a different configuration according to an operating system. For example, in Android or iOS, a single API set may be provided for each platform. In Tizen, two or more API sets may be provided.

The applications 370 (e.g., the application 147) may include, for example, a preloaded application or a third party application. For example, the applications 370 may in include such applications as a home application 371, a dialer application 372, a SMS/MMS application 373, an instant messaging (IM) application 364, a browser application 375, a camera application 376, an alarm application 377, a contact application 378, a voice dial application 379, an email application 380, a calendar application 381, a media player application 382, an album application 383, a clock application 384 and the like.

At least some of the programming module 300 may be implemented by a command stored in a computer-readable storage medium. When the command is executed by one or more processors (e.g., processor 210), the one or more processors perform a function corresponding to the command. The computer-readable storage medium may be, for example, the memory 260. At least some of the programming module 300 may be implemented (e.g., executed) by, for example, the processor 210. At least some of the programming module 300 may include, for example, a module, a program, a routine, sets of instructions, or a process for performing one or more functions.

Names of components of the programming module (e.g., programming module 300) according to the present disclosure may vary depending on a type of operating system. Further, the programming module according to the present disclosure may include one or more of the aforementioned components, omit some of the components, or further include other additional components.

Figure 4:
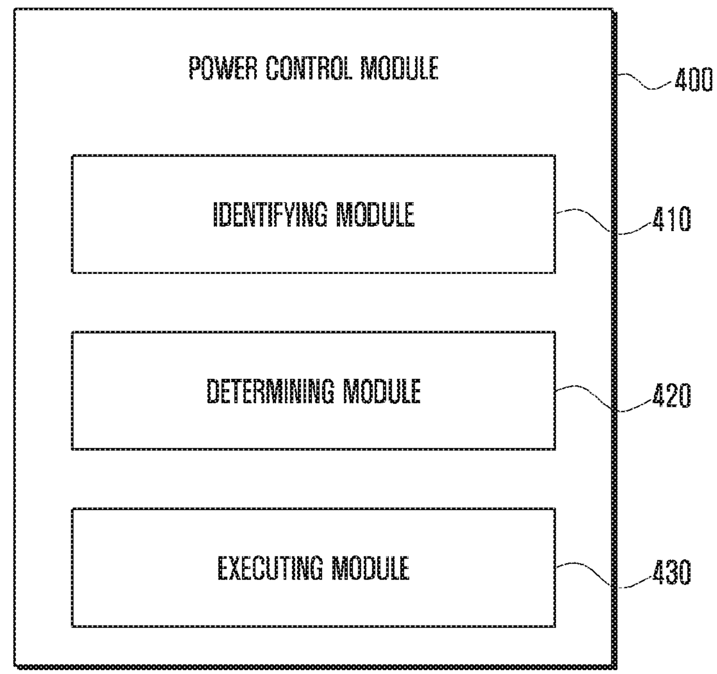
FIG. 4 is a schematic block diagram illustrating a power control module of an electronic device according to various embodiments.

FIG. 4 is a schematic block diagram illustrating a power control module 400 of an electronic device according to various embodiments.

The power control module 400 shown in FIG. 4 may be the power control module 180 shown in FIG. 1. Referring to FIG. 4, the power control module 400 may include, for example, an identifying module 410, a determining module 420, and an executing module 430.

The identifying module 410 may identify the number of and/or attribute of at least one display (e.g., the display 160) functionally connected with the electronic device (e.g., the electronic device 101). According to an embodiment, the electronic device may be functionally connected with a plurality of displays (e.g., a dual display). In this case, according to an embodiment, the identifying module 410 may obtain information about attributes (e.g., luminance, brightness, type, resolution, size, etc.) of at least one of the plurality of displays. According to an embodiment, the identifying module 410 may identify the number of displays functionally connected with the electronic device. For example, if only one display is connected with the electronic device, the identifying module 410 may recognize that the number of displays is singular. If two or more displays are connected with the electronic device, the identifying module 410 may recognize that the number of displays is plural.

According to an embodiment, if there is any display added to the electronic device, the identifying module 410 may identify information about the added display. For example, when any display is further connected with the electronic device, the identifying module 410 may identify the number of or attribute (e.g., luminance, brightness, type, resolution, size, etc.) of the added display. The connection between the electronic device and the display may be made through at least one of a wired connection (e.g., HDMI (High-Definition Multimedia Interface), USB (Universal Serial Bus), etc.), a wireless connection (e.g., Bluetooth, Wi-Fi, etc.), and a mechanical connection (e.g., FPCB (Flexible Printed Circuit Board), etc.).

According to an embodiment, the identifying module 410 may identify the type of an application (e.g., a memo, a webpage, a video, etc.) displayed through at least one display or the combination thereof (e.g., the type of application displayed through the first display and the type of application displayed through the second display). For example, the identifying module 410 may identify, as the first combination, a combination of a message application displayed through the first display and a video application displayed through the second display. For the first combination, the electronic device may execute the second power consumption mode (e.g., a low power consumption mode). Additionally, when a combination of applications executed in the first and second displays is the first combination, the electronic device may execute the first power consumption mode in which a frame rate of the first display is set to about 45 fps and a frame rate of the second display is set to about 60 fps.

According to an embodiment, the identifying module 410 may identify at least one of an angle and a distance between displays functionally connected with the electronic device. For example, when a plurality of (e.g., two) displays are functionally connected with the electronic device, these displays may be folded with a certain angle. For example, when such displays are being folded, the identifying module 410 may identify a change of angle and/or distance between the displays.

According to an embodiment, using a magnetic sensor functionally connected with the electronic device, the identifying module 410 may detect a magnetic force generated by magnet installed in at least one display. This magnetic force may be varied according to angles between displays. Based on the detected magnetic force, the identifying module 410 may calculate or estimate an angle between the displays.

According to an embodiment, the identifying module 410 may identify information about hardware of the electronic device. For example, the hardware information may include at least one of a battery level, attributes of CPU (Central Processing Unit) (e.g., a CPU speed, the number of cores), a memory capacity, a frame buffer size, the number of frame buffers, a touch rate of display, an input standby time of display, and the like. A CPU may include one or more cores. A core may be embedded in at least part of a CPU and perform execution processing. A frame buffer may be a buffer memory used by the electronic device for processing an image to be displayed on a display. A touch rate may be the number of and/or the cycle of sensing a touch input by the electronic device for obtaining a user's touch input through a display functionally connected with the electronic device. An input standby time may be a latency time of the electronic device for obtaining a user's touch input through a display functionally connected with the electronic device.

According to an embodiment, the identifying module 410 may identify a user's gaze toward the electronic device. For example, the electronic device may be functionally connected with the first and second displays. In this case, if a user gazes at the first display only, the identifying module 410 may recognize that a user's gaze is directed to the first display rather than to the second display.

According to an embodiment, the identifying module 410 may identify a specific region at which a user is gazing. For example, a display which physically forms a single entity may have the first region and the second region. If a user gazes at the first region, the identifying module 410 may recognize that a user's gaze is directed to the first region of the display. Similarly, when a user gazes at the second region, the identifying module 410 may identify a user's gaze toward the second region.

According to an embodiment, the identifying module 410 may identify available power (e.g., voltage, current) of a battery functionally connected with the electronic device. For example, the identifying module 410 may check useable battery power at regular intervals (e.g., at 10 ms intervals).

The determining module 420 may determine a method for controlling power of a display functionally connected with the electronic device, based on information identified by the identifying module 410. According to an embodiment, the determining module 420 may determine a power consumption mode of the electronic device from the first and second power consumption modes, based on the number of displays functionally connected with the electronic device. For example, if the number of such displays is singular (e.g., one), the determining module 420 may determine the power consumption mode of the electronic device as the first power consumption mode (e.g., a normal power consumption mode). If the number of such displays is plural (e.g., two), the determining module 420 may determine the power consumption mode of the electronic device as the second power consumption mode (e.g., a low power consumption mode).

The normal power consumption mode may be a mode in which the electronic device supplies electric power required for a normal operation thereof. In the normal power consumption mode, the electronic device may consume electric energy so as to perform normal operations thereof. The low power consumption mode may be a mode having lower power consumption than that of the normal power consumption mode. In the low power consumption mode, the electronic device may restrict the execution of applications or reduce a luminance value of the functionally connected display so as to reduce power consumption in comparison with the normal power consumption mode.

According to an embodiment, the determining module 420 may determine a power consumption mode of the electronic device from the first and second power consumption modes, based on an angle or distance between displays identified by the identifying module 410. For example, if an angle between the displays is greater than a predetermined value (e.g., 15 degrees), the determining module 420 may determine the power consumption mode of the electronic device as the second power consumption mode (e.g., a low power consumption mode).

According to an embodiment, the determining module 420 may determine a power consumption mode of the electronic device from the first and second power consumption modes, based on a battery level (i.e. a residual battery capacity) of the electronic device. For example, if a battery level is smaller than a predetermined value (e.g., 70%), the determining module 420 may determine the power consumption mode of the electronic device as the second power consumption mode (e.g., a low power consumption mode). According to an embodiment, in the second power consumption mode, the electronic device may operate, in a low power consumption mode, a specific display irrelevant to a user's gaze among displays functionally connected with the electronic device. According to an embodiment, in the second power consumption mode, the electronic device may modify at least one of a touch rate, an input standby time, resolution, luminance, and brightness of at least one functionally connected display, based on the frequency or size (e.g., a touch area) of a user's touch input detected through the at least one display. According to an embodiment, in the second power consumption mode, the electronic device may control power consumption of at least one functionally connected display, based on the type of an application (e.g. a message, a video, a webpage) being displayed on the at least one display.

The executing module 430 may execute at least part of one or more functions of the display, based on a specific power consumption mode determined by the determining module 420. According to an embodiment, if the power consumption mode of the electronic device is the first power consumption mode (e.g., a normal power consumption mode), the executing module 430 may operate in a normal power consumption mode predetermined as a default in the electronic device, or consume electric power of the electronic device without any additional power control operation (e.g., brightness control, CPU core control, application usage restriction, etc. for low power consumption).

According to an embodiment, when the power consumption mode of the electronic device is the second power consumption mode (e.g., a low power consumption mode), the executing module 430 may control the attribute (e.g., brightness, luminance, touch sensitivity, etc.) of a display in order to execute the second power consumption mode (e.g., a low power consumption mode). According to an embodiment, for operating in a low power consumption mode on the basis of two or more displays, the executing module 430 may modify at least one of the luminance or resolution of each display, the turn-on/off of each display, the number or speed of processor cores assigned to each display, the number or size of frame buffers, a touch input standby time, a touch detection cycle, and a touch rate. A further description about that will be given below with reference to FIGS. 5 to 12.

According to an embodiment, when there are two or more displays which are functionally connected with the electronic device, the executing module 430 may execute, in a low power consumption mode, a specific display which is irrelevant to a user's gaze toward the electronic device.

According to an embodiment, when another display is further connected with the electronic device, the executing module 430 may execute at least one of the previously connected display(s) and the further connected display in a low power consumption mode.

According to an embodiment, based on an angle or a distance between two or more displays functionally connected with the electronic device, the executing module 430 may modify an application being displayed on such displays.

According to an embodiment, for the second power consumption mode (e.g., a low power consumption mode), the executing module 430 may perform at least one of a low power system setting operation, an application resource control operation, a sensing resource control operation, and a folding resource control operation. A further description about such operations will be given below with reference to FIGS. 10 to 12.

Figure 5:
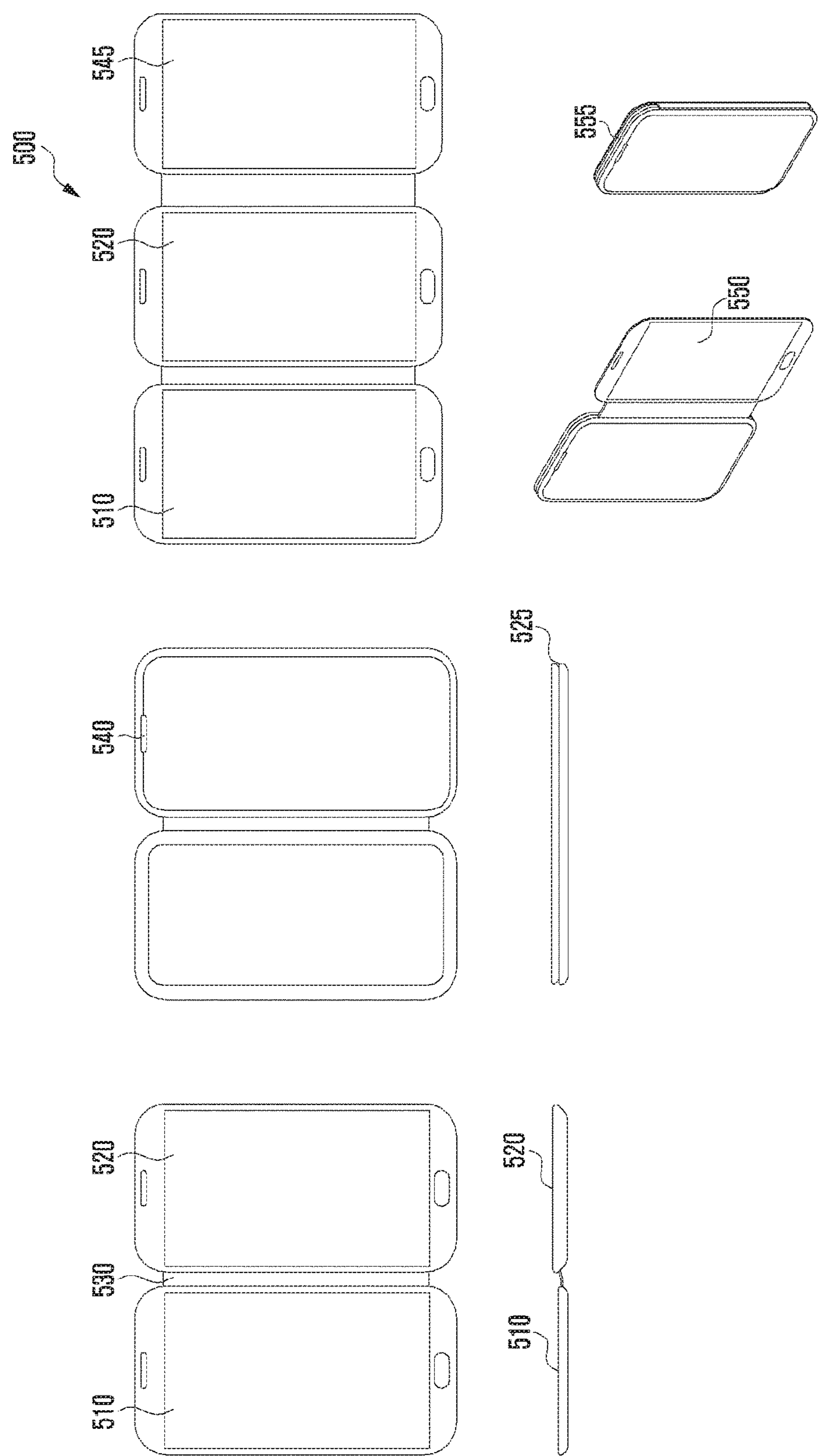
FIG. 5 is a schematic diagram illustrating a connection structure of a plurality of displays in an electronic device according to various embodiments.

FIG. 5 is a schematic diagram illustrating a connection structure of a plurality of displays in an electronic device according to various embodiments.

According to an embodiment, the electronic device may be connected with at least one display. For example, the electronic device may be functionally connected with the first display 510 and the second display 520. According to an embodiment, the first display 510 or the second display 520 may be attachable to or detachable from the electronic device. According to an embodiment, the electronic device may include a cover member 540. In this case, at least part of the cover member 540 may cover at least part (e.g., the front surface or the rear surface) of a body of the electronic device so as to protect the electronic device from any external impact.

According to an embodiment, the electronic device may be functionally connected with an additional display through at least part of the cover member 540. For example, the second display 520 may be attached to a part of the electronic device which is different from a part to which the first display 510 is attached. According to an embodiment, the first and second displays 510 and 520 may be functionally connected with each other through a connecting member 530 which is formed at or corresponds to a part of the cover member 540.

For example, the connecting member 530 may be made of flexible material (e.g., leather, FPCB, a fibrous material, or the like). Therefore, when the first and second displays 510 and 520 are connected with each other through the connecting member 530, one of the first and second displays 510 and 520 may be rotated with regard to the other.

According to an embodiment, by such a rotation of at least one of the first and second displays 510 and 520, the first and second displays 510 and 520 may be in a folded form 525. According to an embodiment, in addition to the first and second displays 510 and 520 connected with each other, the third display 545 may be further attached to or detached from the electronic device.

According to an embodiment, when a case member 550 which is identical or similar to the cover member 540 is attached to one surface (e.g., the rear surface) of the electronic device, at least one of the second and third displays 520 and 545 may be attached to or detached from the case member 550. According to an embodiment, by a rotation of at least one of the first, second and third displays 510, 520 and 545, these displays may form a folded structure 555.

According to an embodiment, the electronic device may be functionally connected with at least one of the first display 510, the second display 520, the third display 545, the fourth display (not shown), and the like by means of short-range communication (e.g., Wi-Fi, Wi-Fi-Direct, WiGig, Bluetooth, BLE (Bluetooth Low Energy), Zigbee, UWB (Ultra-Wide Band), NFC (Near Field Communication), RFID (Radio Frequency Identification), AudioSink, EFC (E-Field Communication), HBC (Human Body Communication), VLC (Visible Light Communication), etc.), or network communication (e.g., internet, LAN (Local Area Network), WAN (Wide Area Network), telecommunication network, cellular network, satellite network, POTS (Plain Old Telephone Service), etc.).

According to an embodiment, the first display 510 or the second display 520 may be an accessory-type display (e.g., a card type) which is physically separate from the electronic device. For example, a user may carry an accessory-type display separately from the electronic device and, if necessary, may attach the display to the electronic device. Examples shown in FIG. 5 are exemplary only and not to be construed as a limitation. Alternatively, the above-discussed connection structure of displays may be favorably applied to various electronic devices, such as an electronic bracelet, a wrist watch, an electronic necklace, or any other wearable device (e.g., glasses, clothes, headset, earphone, shoes, etc.).

Figure 6:
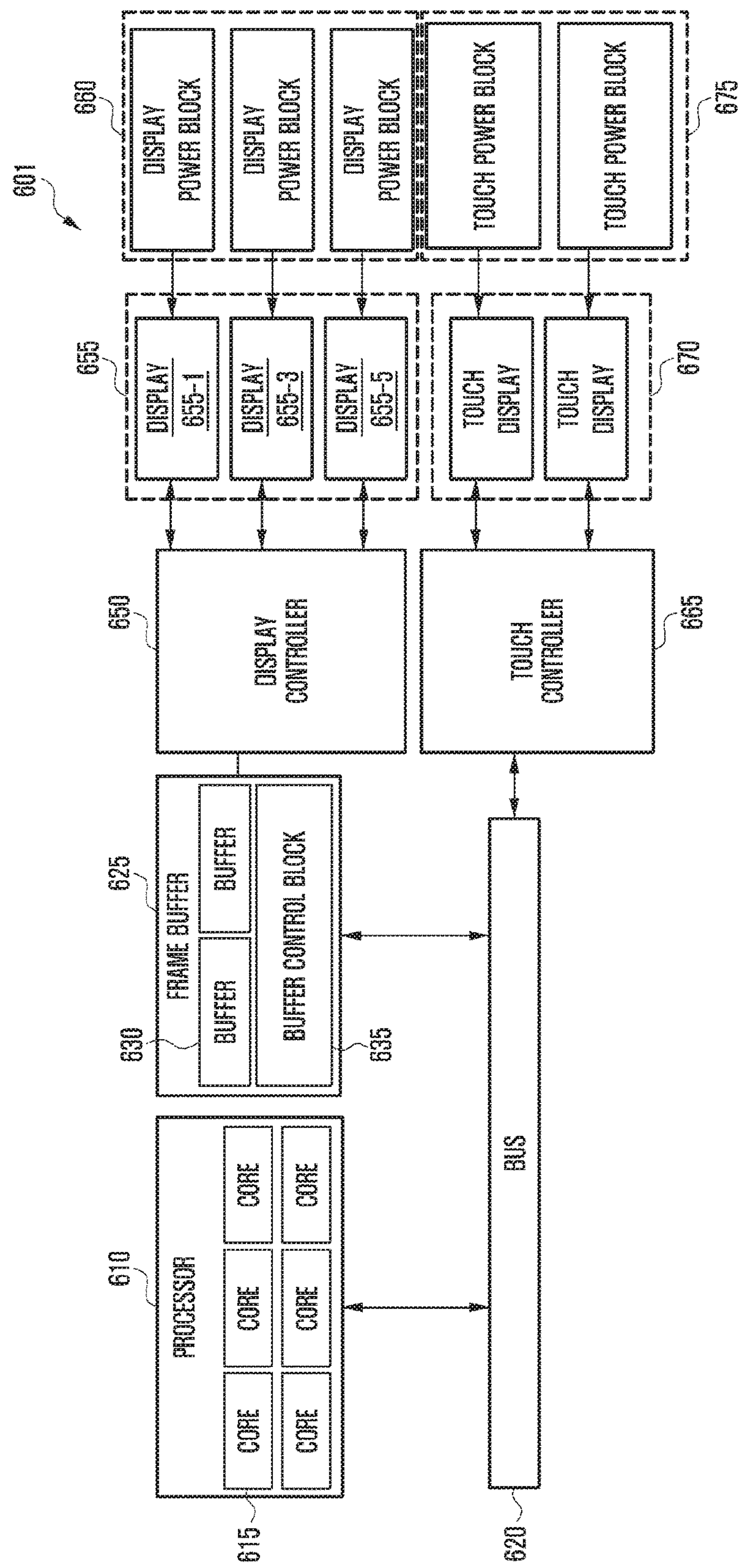
FIG. 6 is a block diagram illustrating an electronic device for controlling a plurality of displays according to various embodiments.

FIG. 6 is a block diagram illustrating an electronic device 601 for controlling a plurality of displays according to various embodiments.

Referring to FIG. 6, the electronic device 601 may include all or part of the electronic device 101 or 200 shown in FIG. 1 or 2. Herein, the repetition of the same as described with reference to FIGS. 1 and 2 will be avoided. The electronic device 601 may include at least one processor 610, a bus 620, a frame buffer 625, a display controller 650, one or more displays 655, one or more display power blocks 660, a touch controller 665, one or more touch displays 670, and one or more touch power blocks 675.

According to an embodiment, the processor 610 may be formed of one or more cores 615. In case of having a plurality of cores 615, the processor 610 may use different numbers of cores depending on applications executed in the electronic device. For example, if a message application is executed in the electronic device, the processor 610 may use three cores. If a 3-dimensional game application is executed, five cores may be used.

According to an embodiment, the processor 610 may set the number of cores depending on displays functionally connected with the electronic device. For example, the processor 610 may use three cores in case of the first display 655-1 and use six cores in case of the second display 655-3. According to an embodiment, the processor 610 may vary the number of usable cores depending on the attributes of display. For example, the processor 610 may use five cores when the first display 655-1 supports a high resolution (e.g., FHD (Full High Definition)), and use two cores when the third display 655-5 supports a low resolution.

According to an embodiment, the frame buffer 625 may include one or more buffers 630 and a buffer control block 635. The processor 610 may vary the use of frame buffer 625 having the buffers 630, depending on the displays 655. For example, based on the attributes (e.g., number or resolution) of the displays 655 functionally connected with the electronic device, the processor 610 may determine the size and number of the buffers 630 through the buffer control block 635.

According to an embodiment, the display power block 660 may control power of the displays 655 functionally connected with the electronic device. For example, the display power block 660 may supply electric power to the at least one display 655. According to an embodiment, the display power block 660 may be assigned to each display 655 and control power consumption of the corresponding display 655. For example, each individual display power block 660 may turn on or off the corresponding display 655.

According to an embodiment, the touch controller 665 may control the touch displays 670. For example, the touch controller 665 may control at least one of a touch rate, a touch input standby time and a touch region of the touch displays 670. According to an embodiment, the touch display 670 may be combined with or attached to the display 655. For example, the touch display 670 may be joined to the front or rear surface of the display 655 and detect a touch input from a user. According to an embodiment, the touch power block 675 may supply electric power to the touch display 670. For example, each individual touch power block 675 may control power consumption of each assigned touch display 670.

According to an embodiment, the touch display 670 and the display 655 may be not separated from each other and instead formed of a single display (not shown). In this case, the display power block 660 and the touch power block 675 may be formed of a single power block (not shown).

Figure 7:
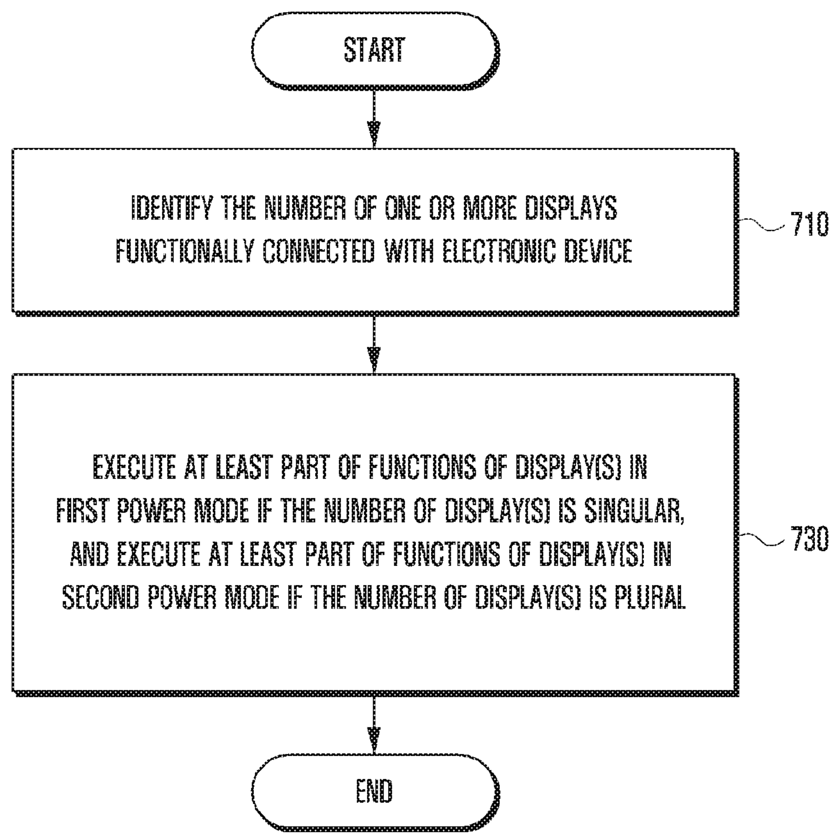
FIG. 7 is a flow diagram illustrating a method for controlling a power consumption mode based on the number of displays in an electronic device according to various embodiments.

FIG. 7 is a flow diagram illustrating a method for controlling a power consumption mode based on the number of displays in an electronic device according to various embodiments. Referring to FIG. 7, at operation 710, the electronic device (e.g., the identifying module 410) may identify the number of one or more displays functionally connected with the electronic device.

According to an embodiment, at operation 730, if the number of displays is singular, the electronic device (e.g., the executing module 430) may execute at least part of one or more functions of the one or more displays in first power consumption mode (e.g., a normal power usage mode). According to an embodiment, in case of the first power consumption mode, the electronic device may not execute additional functions (e.g., functions for changing brightness, luminance, power consumption, etc. of the display) for a saving of power consumption.

On the other hand, at operation 730, if the number of displays is plural, the electronic device (e.g., the executing module 430) may execute at least part of one or more functions of the one or more displays in the second power consumption mode (e.g., a low power usage mode). According to an embodiment, in case of the second power consumption mode, the electronic device may execute additional functions (e.g., functions for changing brightness, luminance, power consumption, etc. of the display) for a saving of power consumption.

Figure 8:
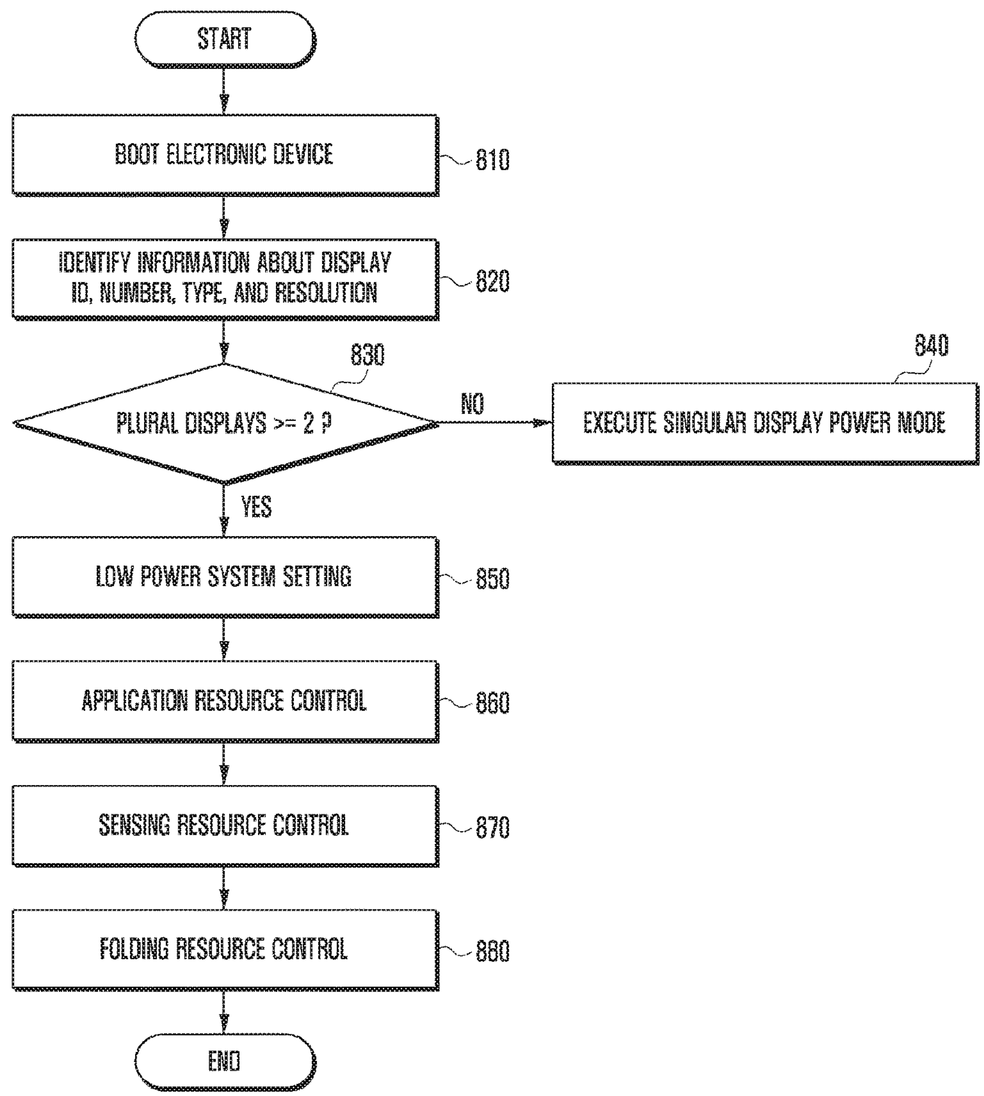
FIG. 8 is a flow diagram illustrating a method for executing a low power consumption mode in an electronic device according to various embodiments.

FIG. 8 is a flow diagram illustrating a method for executing a low power consumption mode in an electronic device according to various embodiments.

Referring to FIG. 8, at operation 810, when the power of the electronic device is turned on, the electronic device may start a system booting. According to an embodiment, during a system booting, the electronic device may obtain information associated with the system (e.g., CPU, memory, display, etc.).

According to an embodiment, at operation 820, the electronic device may identify information about ID, number, type, and/or resolution of the display which is functionally connected with the electronic device. For example, the electronic device may identify basic information, such as the attributes of display (e.g., a luminance range, frame rate supportability, resolution (e.g., FHD (Full High Definition), WQHD (Wide Quad High Definition), UHD (Ultra High Definition))) or the type of display (e.g., TFT (Thin Film Transistor), AMOLED (Active Matrix Organic Light Emitting Diodes)).

According to an embodiment, at operation 830, the electronic device may identify the number of displays functionally connected with the electronic device. For example, the electronic device may determine whether the number of displays functionally connected with the electronic device is plural.

According to an embodiment, at operation 840, if the number of displays is one, the electronic device may execute a single display power consumption mode which may be a normal power usage mode that requires no additional operation for reducing power consumption.

According to an embodiment, at operation 850, if the number of displays is two or more, the electronic device may set up a low power system to execute a low power consumption mode (e.g., the second power consumption mode). For example, the electronic device may control (e.g., change) various system setting values thereof so as to operate in the second power consumption mode. According to an embodiment, the electronic device may reset (e.g., change) the core (e.g., 615) of the processor (e.g., 610) or a clock speed (e.g., about 1 GHz).

According to an embodiment, the electronic device may set the number of CPU cores to be used by the display, based on the attributes (e.g., resolution, number, or type) of the display. For example, in case the display can support a specific resolution more than a given value (e.g., 1600×900), the electronic device may determine that five cores can be used by the display. According to an embodiment, based on the number or resolution of the displays, the electronic device may set the size or quantity of the buffer (e.g., 630) of the frame buffer (e.g., 625) to be used for displaying an image on the display.

According to an embodiment, based on the number or resolution of the displays, the electronic device may set a touch rate or a touch input standby time required for the display to detect a touch input. For example, in case of a low power consumption mode, the electronic device may lower a touch rate of the touch display (e.g., touch display 670) through the touch controller (e.g., touch controller 665) to a specific value (e.g., a touch rate of about 25 ms) or less so as to reduce power consumption for a touch detection.

At an application resource control operation 860, the electronic device may execute a low power consumption mode, depending on the type of an application displayed on the display.

According to an embodiment, depending on the type of an application displayed on at least one display, the electronic device may reduce power consumption by changing the attributes (e.g., luminance, a frame rate, a touch rate, etc.) of the display and/or the attributes (e.g., the number of cores, a clock speed, etc.) of the CPU. According to an embodiment, a setting range (e.g., maximum, minimum, default, etc.) of luminance may be set differently depending on displays. For example, the electronic device may change a luminance value of the display according to the type of an application displayed on the display.

For example, the electronic device may set a luminance value of the first display to the first luminance value (e.g., about 180 cd) and also set a luminance value of the second display to the second luminance value (e.g., about 170 cd). In this case, if a message application is displayed on the first display and also if a video application is displayed on the second display, the electronic device may change the first luminance value or the second luminance value to the third luminance value (e.g., about 130 cd) or the fourth luminance value (e.g., about 140 cd).

According to an embodiment, the electronic device may set the priority of each display and change the attributes of the display. For example, if any application is displayed through the first display, the luminance of the second or third display having higher priority than that of the first display may be changed earlier than that of the first display. According to an embodiment, the electronic device may alter the order of changing the attributes of the display, depending on an application displayed on the first display and/or the second display. For example, if an application is displayed on the first display only, the luminance of the second display may be changed earlier than that of the first display.

According to an embodiment, based on a combination of applications displayed on at least one display, the electronic device may set a frame rate of the display. For example, if a message application is displayed on the first display and simultaneously, at least for a while, if an internet application is displayed on the second display, the electronic device may set the first frame rate (e.g., about 45 fps) at the first display and also set the second frame rate (e.g., about 60 fps) at the second display.

According to an embodiment, based on an application displayed on at least one display, the electronic device may vary or restrict the number of cores assigned to at least one display and a clock speed of such cores. For example, if a game application is displayed on the first display and if a message application is displayed on the second display, the electronic device may assign two cores to the first display and also set a clock speed to about 2 GHz. On the other hand, the electronic device may assign five cores to the second display and also set a clock speed to about 1 GHz.

According to an embodiment, depending on circumstances, the electronic device may change the number of cores assigned to each display and a clock speed. For example, if more cores are required than cores assigned to the second display, the electronic device may reduce cores assigned to the first display and further assign such cores to the second display. Additionally, the electronic device may adjust the number of cores (e.g., a common core) assigned in common to displays, depending on circumstances of an application displayed on the display. For example, if three cores are needed for the second display, at least part of cores assigned in common to plural displays may be further assigned to the second display.

According to an embodiment, based on the type or combination of applications displayed on the display(s), the electronic device may change a touch rate. For example, the electronic device may change a touch rate, based on the number of touch inputs for each application and/or an input standby time. For example, if there is no touch input for a given time (e.g., about 10 us) on the first display, the electronic device may change a touch rate of the first display.

For example, in case of the display having no touch input for a given time (e.g., about 10 us), the electronic device may reduce a touch rate for detecting a touch input (e.g., from about 90 Hz to about 60 Hz). According to an embodiment, if the display fails to detect a touch input for a given time (e.g., about 1 μs), the electronic device may turn off an image displayed on the display and activate a touch input region on only at least part of the display. According to an embodiment, if no touch input is detected for a given time (e.g., about 1 μs) for detecting a touch input, the electronic device may lower a touch rate of the display step by step so as to reduce power consumption.

At a sensing resource control operation 870, the electronic device may execute a low power consumption mode, based on a battery level. According to an embodiment, the electronic device may sense a battery level (i.e., a residual battery capacity) and then execute differently a low power consumption mode for each battery level. For example, if a battery level is about 80%, the electronic device may operate in the first low power consumption mode (e.g., a change in brightness of the display). If a battery level is about 50%, the electronic device may perform at least part of one or more functions thereof in the second low power consumption mode (e.g., a change in luminance of the display).

At a folding resource control operation 880, the electronic device may execute a low power consumption mode, based on a folding degree of a display. Namely, based on an angle between adjacent displays functionally connected with the electronic device, the attributes (e.g., luminance, brightness, power supply on/off, etc.) of the display may be changed.

Figure 9A:
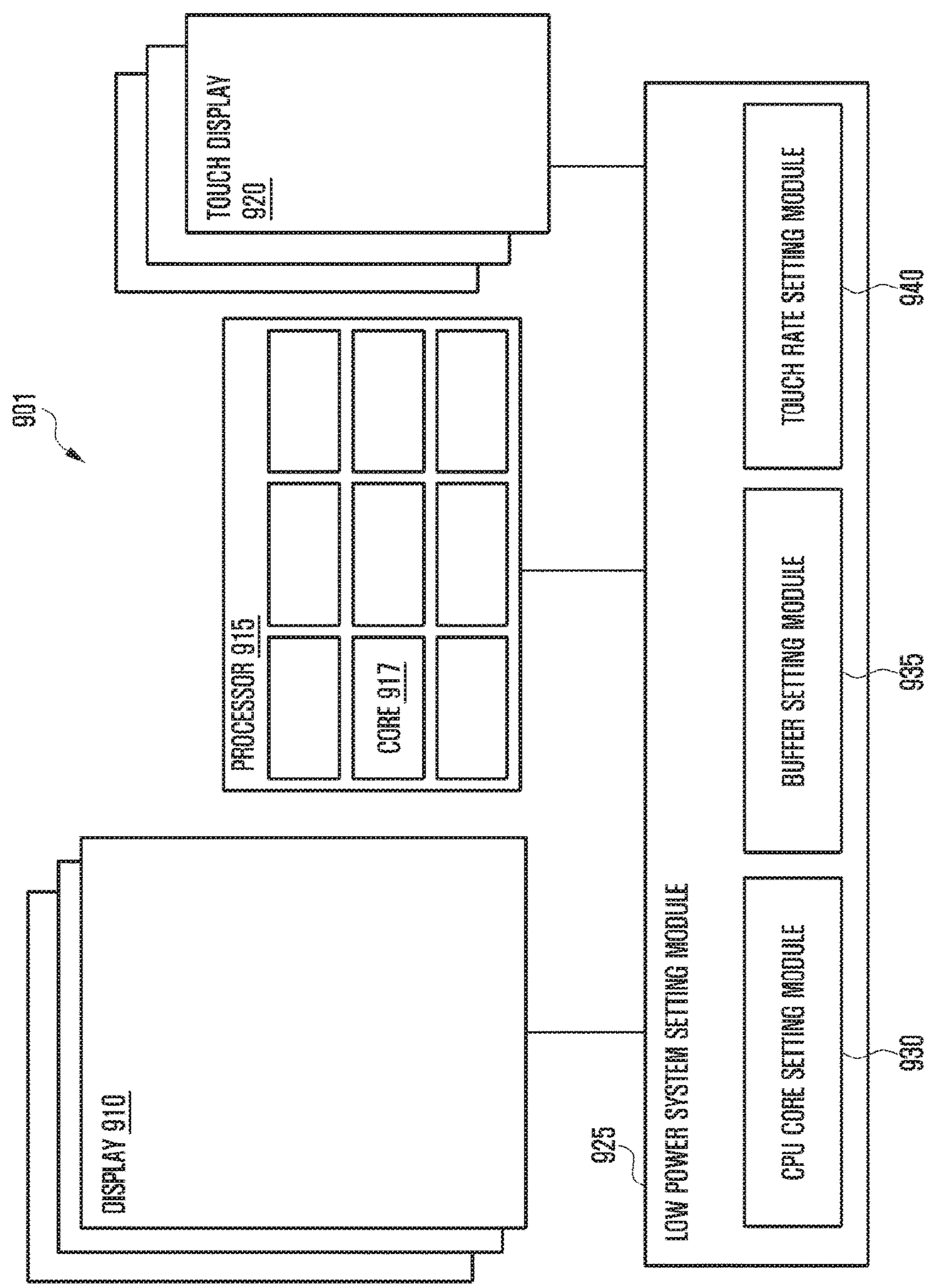
FIGS. 9A and 9B are diagrams illustrating an example of setting a low power system in an electronic device according to various embodiments.

FIG. 9A is a block diagram illustrating an electronic device according to various embodiments.

Referring to FIG. 9A, the electronic device 901 (e.g., 101) in an embodiment may include at least one display 910, a processor 915, at least one touch display 920, and a low power system setting module 925.

According to an embodiment, the electronic device 901 may include at least one of a plurality of displays 910. Based on the number of such displays connected with the electronic device 901, a power consumption mode of the electronic device 901 may be determined. For this determination, the lower power system setting module 925 may include a CPU core setting module 930, a buffer setting module 935, and a touch rate setting module 940. For example, the CPU core setting module 930 may select at least part of cores 917 contained in the CPU 915 to be used by the display 910, or set a CPU clock. According to an embodiment, the CPU core setting module 930 may set a CPU core of each display, based on the attributes of the display or a support mode (e.g., a video mode or a CMD mode) of the display.

According to an embodiment, the buffer setting module 935 may set the attributes (e.g., a size or number, etc.) of the frame buffer (e.g., frame buffer 625) in the electronic device. For example, the buffer setting module 935 may assign a buffer to the at least one display 910 functionally connected with the electronic device. According to an embodiment, the buffer setting module 935 may change the size or number of the assigned buffer, based on the attributes (e.g., resolution, luminance, brightness, or power) of the display. According to an embodiment, the buffer setting module 935 may change a buffer size, based on the type of an application displayed on the display. For example, the buffer setting module 935 may assign a buffer, e.g., of about 16 kilobytes (KB), to the first display when a video is displayed on the first display, and assign a buffer, of about 20 KB, to the second display when a message is displayed on the second display.

According to an embodiment, the touch rate setting module 940 may set a touch rate of the at least one touch display 920 contained in the electronic device 901. For example, based on the number and/or resolution of the at least one display functionally connected with the electronic device, a touch rate or a touch input standby time of the at least one touch display 920 may be set.

Figure 9B:
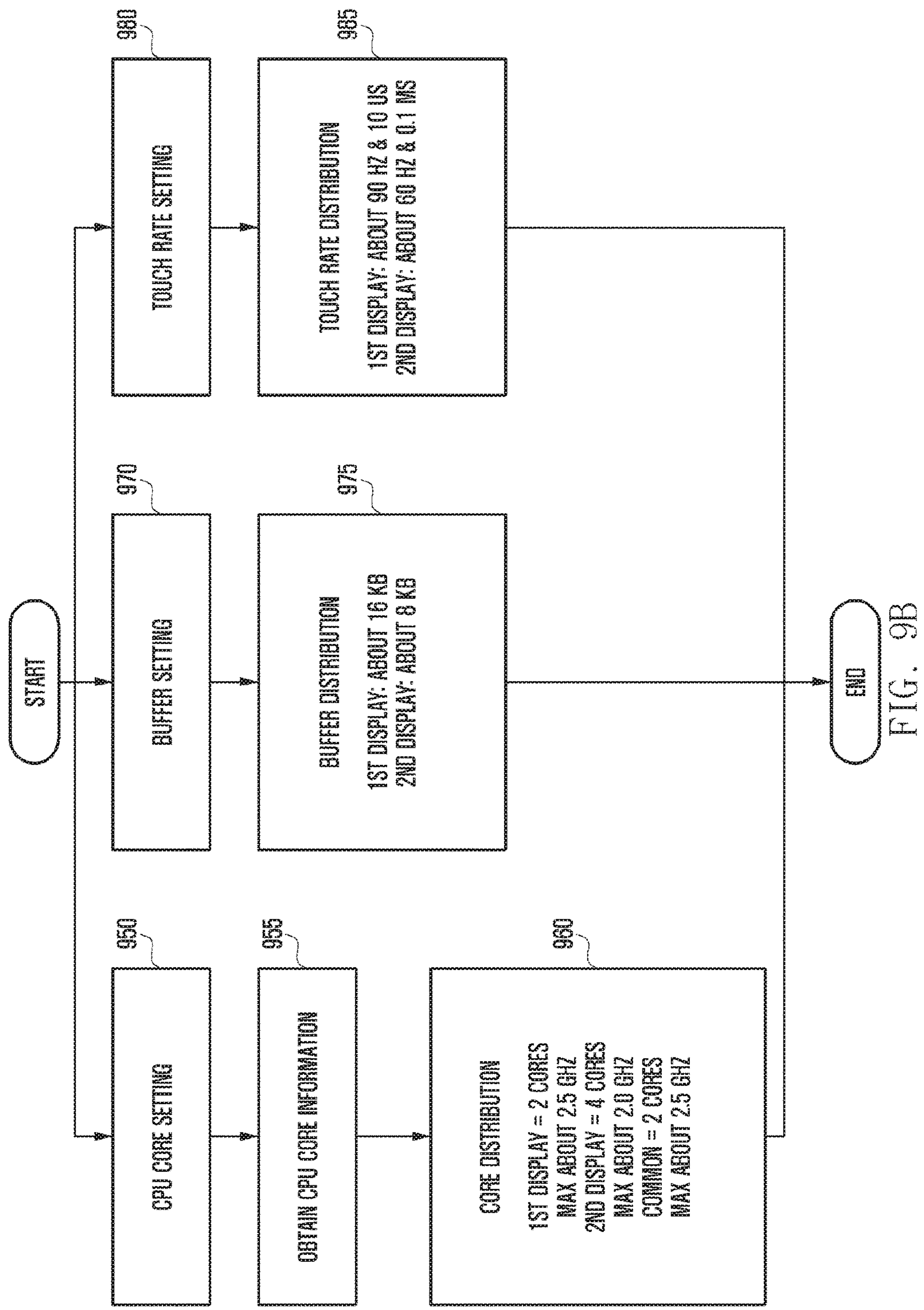

FIG. 9B is a flow diagram illustrating a method for setting a low power system in an electronic device according to various embodiments.

Referring to FIG. 9B, the electronic device 901 may execute at least one of a CPU core setting operation 950, a buffer setting operation 970, and a touch rate setting operation 980. At CPU core setting operation 950, the electronic device may set a CPU core, for example.

At operation 955, the electronic device may obtain information about at least one of cores contained in the CPU. According to an embodiment, such information about a core may include information about the number of cores in the CPU and/or information about a clock of the CPU core.

At operation 960, the electronic device may set the number of cores or a clock speed to at least one display. For example, the electronic device may assign two cores to the first display and set a clock speed to about 2.5 GHz. Also, the electronic device may assign four cores to the second display and set a clock speed to about 2.0 GHz.

At buffer setting operation 970, the electronic device may set a buffer for each display. For example, the electronic device may set the number of frame buffers, or a buffer size, to be used for at least one display functionally connected with the electronic device.

At operation 975, the electronic device may distribute such a buffer to each display. According to an embodiment, the electronic device may assign a buffer, based on the attributes (e.g., resolution) of the display. For example, the electronic device may assign three buffers and distribute a buffer size, e.g., of about 16 KB, to the first display using a resolution of full-high definition (FHD). Also, the electronic device may assign two buffers and distribute a buffer size, e.g., of about 8 KB, to the second display using a resolution of quad high resolution (QHD).

At touch rate setting operation 980, the electronic device may set a touch rate or a touch input standby time of the touch display, based on the attributes (e.g., resolution) of at least one display. At operation 985, the electronic device may distribute such a touch rate or such a touch input standby time to at least one display or to at least one touch display. For example, the electronic device may set a touch rate of the first display using a resolution of FHD (e.g., to about 90 Hz) and set a touch input standby time (e.g, to about 10 μs). Also, the electronic device may set a touch rate of the second display using a resolution of QHD to about 60 Hz and set a touch input standby time to about 0.1 ms.

Figure 10A:
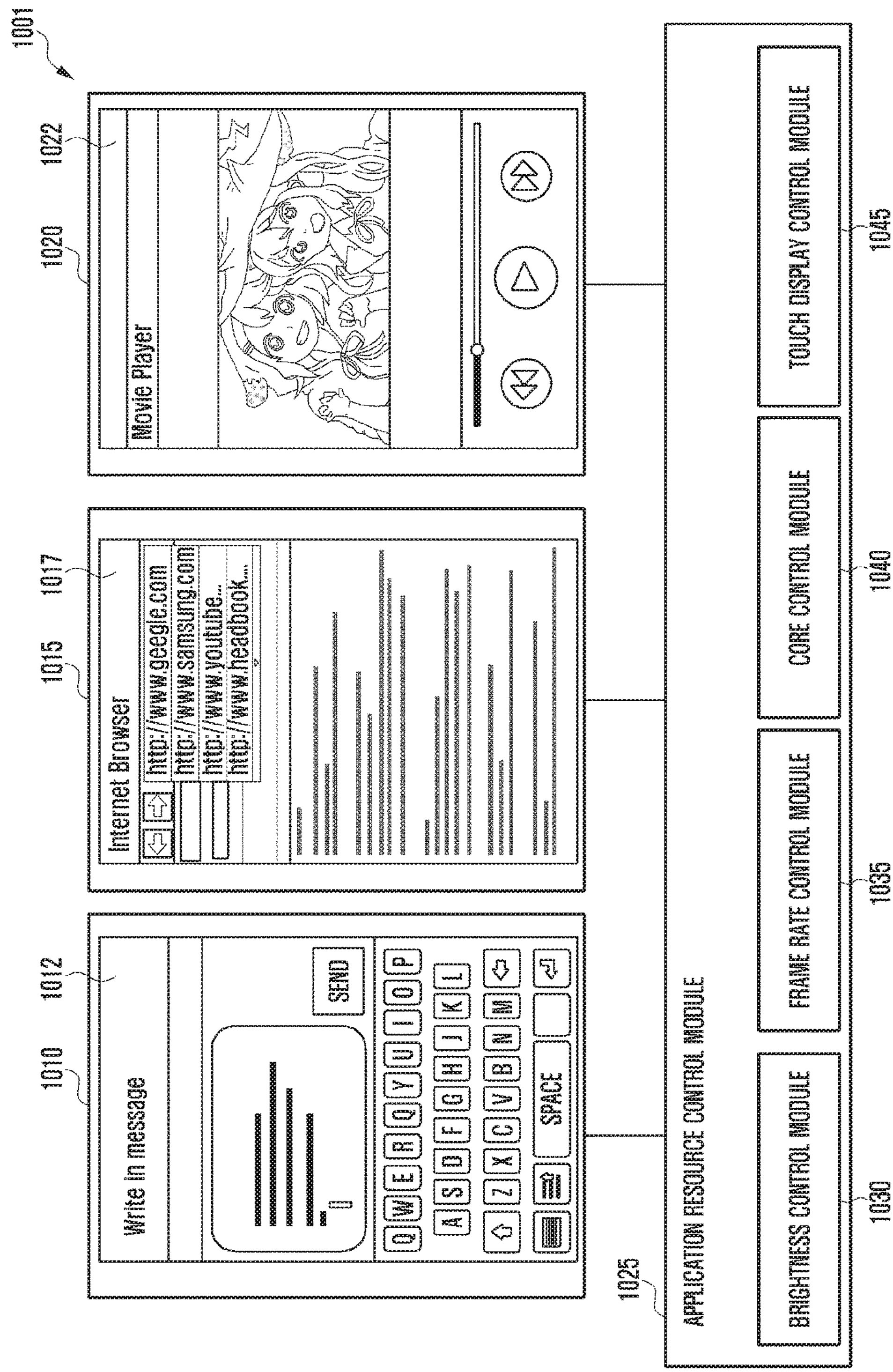
FIGS. 10A and 10B are diagrams illustrating an example of controlling application resources in an electronic device according to various embodiments.

FIG. 10A is a diagram illustrating an example of controlling application resources in an electronic device according to various embodiments.

Referring to FIG. 10A, the electronic device may control resources (e.g., brightness, a frame rate, a core, a touch rate, etc.) thereof, based on the type of an application displayed on the display.

According to an embodiment, the electronic device 1001 (e.g., 101) may display at least one application through at least one of the first display 1010, the second display 1015 and the third display 1020 all of which are functionally connected with the electronic device. For example, the electronic device may display the first application 1012 on the first display 1010, display the second application 1017 on the second display 1015, and display the third application 1022 on the third display 1020. An application resource control module 1025 which is functionally connected with the at least one display may perform at least part of one or more functions of the electronic device or of the displays 1010, 1015 and 1020 in a low power consumption mode, based on the type of an application displayed on each display.

According to an embodiment, the application resource control module 1025 may include a brightness control module 1030, a frame rate control module 1035, a core control module 1040, and a touch display control module 1045. Additionally, depending on types of applications displayed on the first, second and third displays 1010, 1015 and 1020, the application resource control module 1025 may change at least one of a display brightness, a frame rate, the number of CPU cores, a clock speed, and a touch rate so as to operate the electronic device in a low power consumption mode.

Figure 10B:
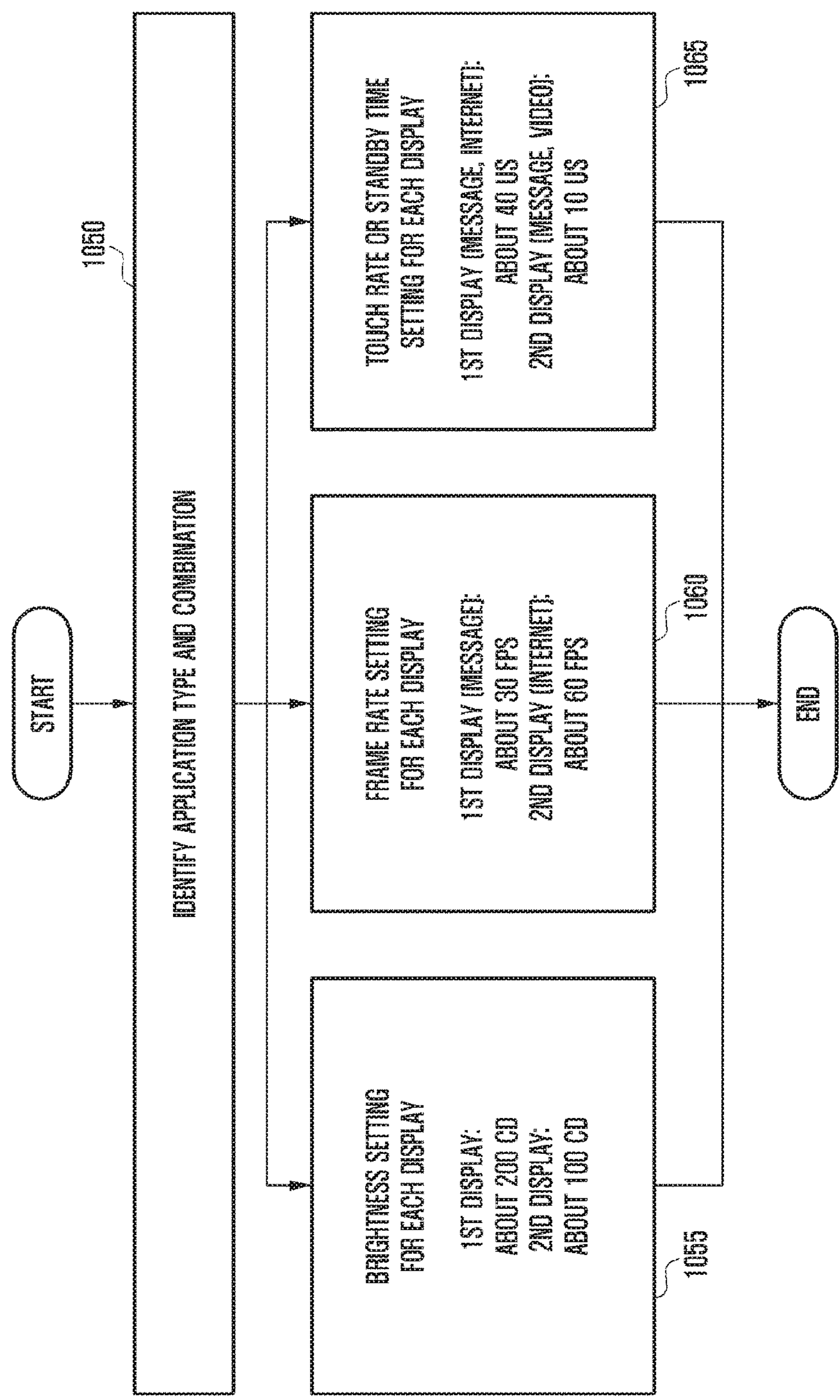

FIG. 10B is a flow diagram illustrating a method for controlling application resources in an electronic device according to various embodiments. The electronic device may operate in a low power consumption mode, based on the type or combination of displays functionally connected with the electronic device.

Referring to FIG. 10B, at operation 1050, the electronic device may identify the type of an application displayed through the functionally connected display or a combination of such applications.

For example, based on a combination of the first application (e.g., message) displayed on the first display and the second application (e.g., video) displayed on the second display, the electronic device may change setting of a low power consumption mode. For example, in case both the first and second applications are applications (e.g., video) which need less touch input relatively, the electronic device may lower a touch rate of the first or second display to a specific value (e.g., about 40 μs) or below.

At operation 1055, the electronic device may set brightness of at least one display, based on types or combination of applications. For example, if the first application displayed on the first display is video and if the second application displayed on the second display is internet, the electronic device may set the brightness of the first display to the first brightness (e.g., about 200 cd) and also set the brightness of the second display to the second brightness (e.g., about 100 cd).

At operation 1060, the electronic device may set a frame rate of at least one display, based on types or combination of applications. For example, if the first application displayed on the first display is video and if the second application displayed on the second display is internet, the electronic device may set the frame rate of the first display to the first frame rate (e.g., about 150 FPS) and also set the frame rate of the second display to the second frame rate (e.g., about 60 FPS).

At operation 1065, the electronic device may set a touch rate and/or a touch input standby time of at least one display, based on types or combination of applications. For example, if the first application displayed on the first display is video and if the second application displayed on the second display is photo, the electronic device may set the touch rate of the first display to the first touch rate (e.g., about 40 μs) and also set the touch rate of the second display to the second touch rate (e.g., about 60 μs).

Figure 11A:
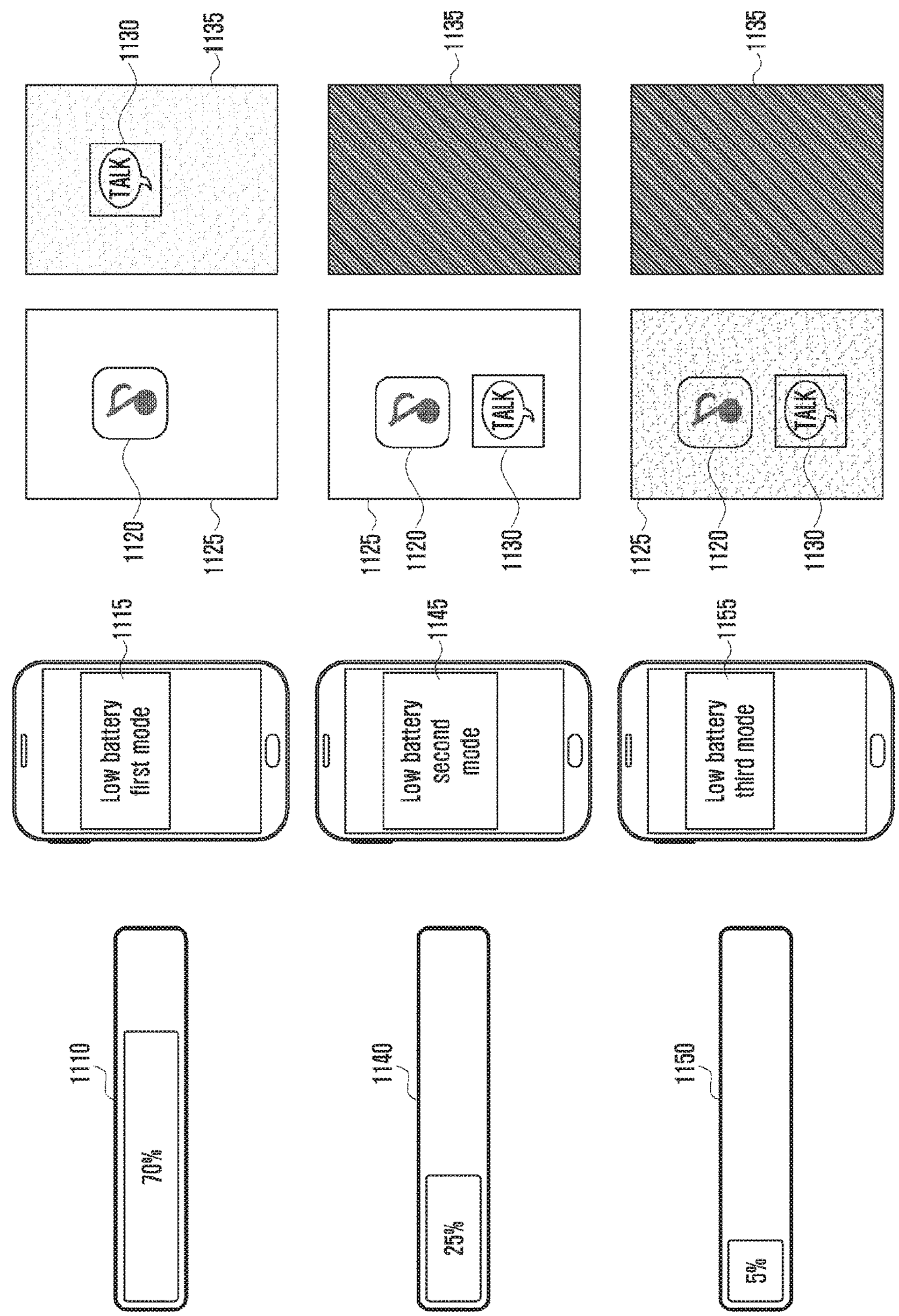
FIGS. 11A and 11B are diagrams illustrating an example of controlling a display based on an available battery capacity in an electronic device according to various embodiments.

FIG. 11A is a diagram illustrating an example of controlling a display based on an available battery capacity in an electronic device according to various embodiments. The electronic device may operate in a low power consumption mode, based on an available battery capacity, for example.

Referring to FIG. 11A, the electronic device may execute a low power consumption mode for at least one display, based on an available battery capacity. For example, the electronic device may sense a residual current (or voltage) status of a battery functionally connected with the electronic device and then perform differently a low power consumption mode for each stage of the battery residual capacity.

According to an embodiment, the electronic device may display the first application 1120 (e.g., a music player) on the first display 1125 and display the second application 1130 (e.g., messenger) on the second display 1135.

According to an embodiment, in case the first battery level 1110 indicates about 70%, the electronic device may display the first low power consumption mode indication 1115 to the user. Based on the first battery level 1110, the electronic device may operate at least one of the first and second displays 1125 and 1135 in the first low power consumption mode. For example, the electronic device may operate the second display in the first low power consumption mode when a user does not gaze at the second display. In the first low power consumption mode, the attributes of the display and/or the number of CPU cores may be changed to the first level. For example, the electronic device may reduce the brightness of the second display 1135 in comparison with that of the first display 1125.

According to an embodiment, in case the second battery level 1140 indicates about 25%, the electronic device may display the second low power consumption mode indication 1145 to the user. Based on the second battery level 1140, the electronic device may operate at least one of the first and second displays 1125 and 1135 in the second low power consumption mode. For example, in the second low power consumption mode, the attributes of the display and/or the number of CPU cores may be changed to the second level. For example, in the second low power consumption mode, the electronic device may turn off the second display and display the second application 1130 through the first display 1125.

According to an embodiment, in case the third battery level 1150 indicates about 5%, the electronic device may display the third low power consumption mode indication 1155 to the user. Based on the third battery level 1150, the electronic device may operate at least one of the first and second displays 1125 and 1135 in the third low power consumption mode. For example, in the third low power consumption mode, the attributes (e.g., luminance, brightness, a touch rate, etc.) of the display and/or the number of CPU cores may be changed to the third level. For example, in the third low power consumption mode, the electronic device may turn off the second display and display the first application 1120 and/or the second application 1130 through the first display 1125. Additionally, the electronic device may reduce the brightness of the first display 1125 than ever.

Figure 11B:
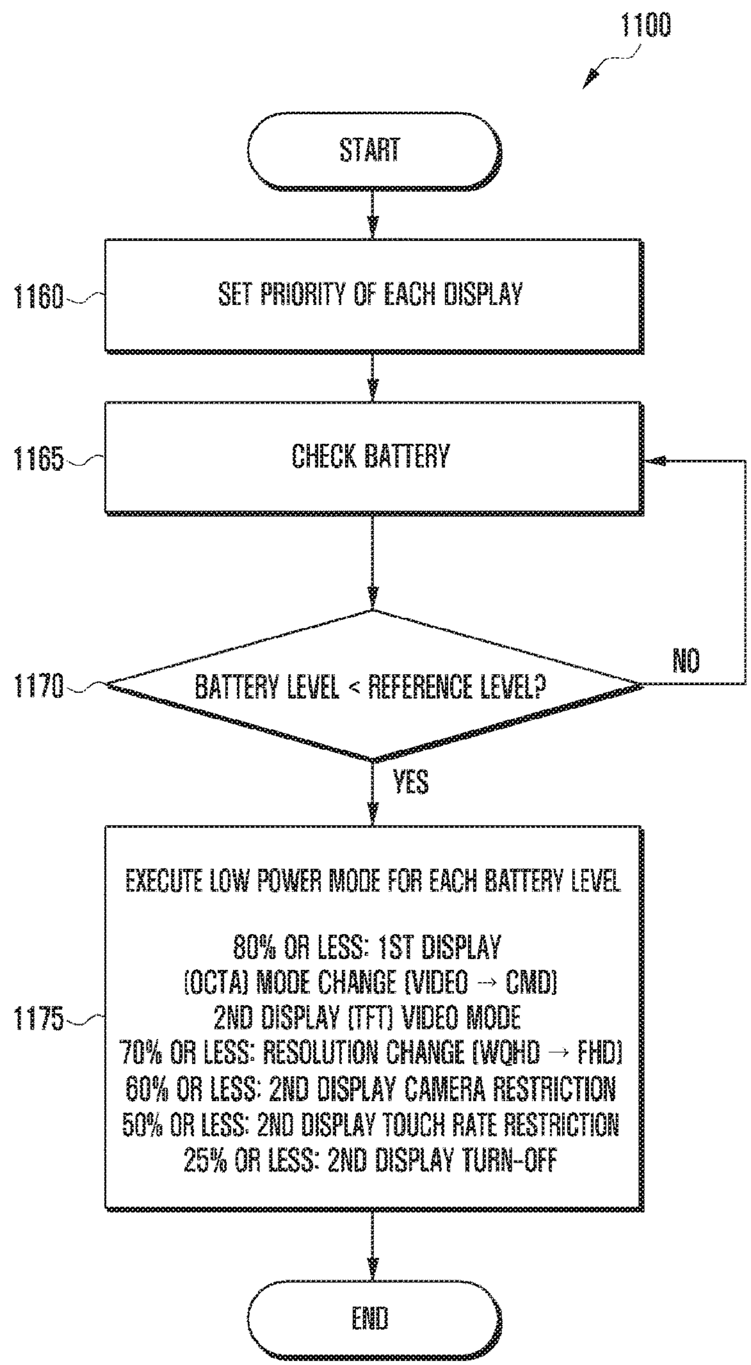

FIG. 11B is a flow diagram 1100 illustrating a method for controlling a display based on an available battery capacity in an electronic device according to various embodiments. According to an embodiment, for a low power control, the electronic device may set the priority of each display. For example, based on such priorities, the electronic device may execute a low power consumption mode.

Referring to FIG. 11B, at operation 1160, the electronic device may set the priority of each display. For example, the electronic device may assign the order of changing the luminance of at least one display differently from that of another display. For example, if the first priority is assigned to the first display and if the second priority is assigned to the second display, the electronic device which operates in a low power consumption mode may change first the luminance of the first display and then change the luminance of the second display. According to an embodiment, such priorities may not be always required for a low power consumption mode.

At operation 1165, the electronic device may check a current battery level. Then, at operation 1170, the electronic device may determine whether the current battery level is smaller than a reference level (e.g., about 80% of the entire capacity).

At operation 1175, the electronic device may execute a low power consumption mode corresponding to the current battery level. According to an embodiment, if the battery level is within the first range (e.g., between about 70% and about 80%), the electronic device may operate in the first low power consumption mode. According to an embodiment, in the first low power consumption mode, the electronic device may convert a display mode of the first display to a low power display mode (e.g., from a video mode to a CMD mode).

According to an embodiment, if the battery level is within the second range (e.g., between about 60% and about 70%), the electronic device may operate in the second low power consumption mode. According to an embodiment, in the second low power consumption mode, the electronic device may change the resolution of the first display and/or the second display (e.g., from WQHD to FHD).

According to an embodiment, if the battery level is within the third range (e.g., between about 50% and about 60%), the electronic device may operate in the third low power consumption mode. According to an embodiment, in the third low power consumption mode, the electronic device may restrict an application (e.g., camera) displayed on the second display. For example, in the third range, a camera application displayed on the second display may be stopped.

According to an embodiment, if the battery level is within the fourth range (e.g., between about 25% and about 50%), the electronic device may operate in the fourth low power consumption mode. According to an embodiment, in the fourth low power consumption mode, the electronic device may restrict a touch rate of the second display to a given value (e.g., about 10 ms) or less so as to reduce power consumption.

According to an embodiment, if the battery level is within the fifth range (e.g., between about 0% and about 25%), the electronic device may operate in the fifth low power consumption mode. According to an embodiment, in the fifth low power consumption mode, the electronic device may turn off the second display so as to reduce power consumption.

Figure 12:
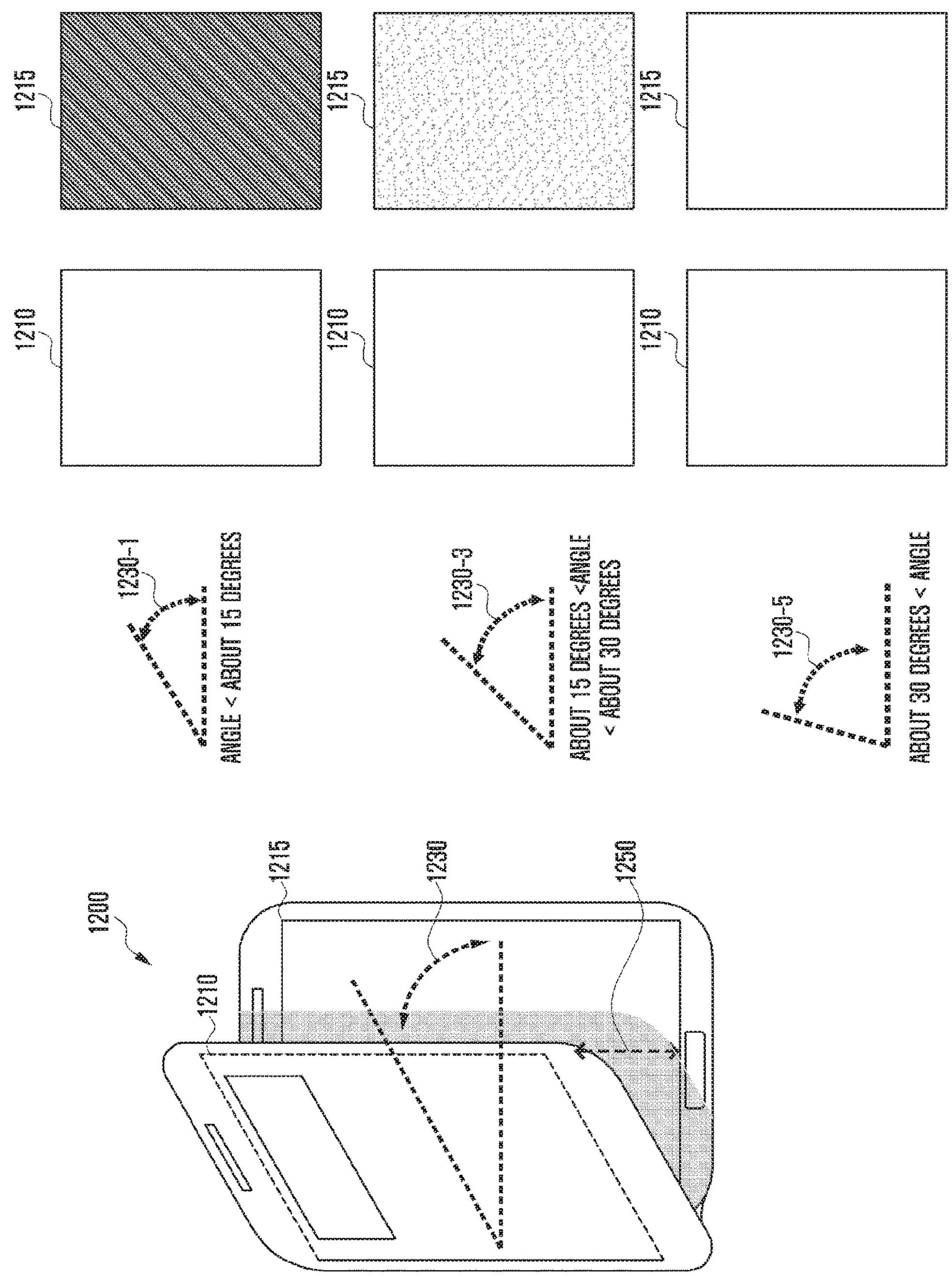
FIG. 12 is a diagram illustrating a method for controlling a plurality of displays in an electronic device according to various embodiments.

FIG. 12 is a diagram illustrating a method for controlling a plurality of displays based on an angle or distance between adjacent displays in an electronic device according to various embodiments. According to an embodiment, based on an angle 1230 and/or a relative distance 1250 between one display and another display both of which are functionally connected with the electronic device, the electronic device may execute different low power consumption modes.

Referring to FIG. 12, the electronic device 1200 may identify (e.g., measure) the angle 1230 or the distance 1250 between the first display 1210 and the second display 1215. According to an embodiment, the electronic device may measure the angle 1230 and/or the distance, based on a magnetic force of magnet installed in at least one of the first and second displays 1210 and 1215. According to an embodiment, the electronic device may measure a rotation angle of the first display 1210 or the second display 1215, based on a hinge installed therein. Further, based on such a rotation angle, the electronic device may measure the angle 1230 between the first and second displays 1210 and 1215.

According to an embodiment, the electronic device may execute a low power consumption mode, based on the angle 1230 between the first and second displays 1210 and 1215. For example, based on the angle 1230 or the distance 1250, the electronic device may change the order of turning on the first display 1210 or the second display 1215, or vary a luminance value.

According to an embodiment, if the angle is the first angle 1230-1 (e.g., smaller than about 15 degrees), the electronic device may stop the supply of electric power to the first display 1210 and/or the second display 1215. For example, in case of the first angle 1230-1, the electronic device may not supply electric power to the second display 1215 while continuing to supply electric power to the first display 1210.

According to an embodiment, if the angle is the second angle 1230-3 (e.g., between about 15 degrees and about 30 degrees), the electronic device may change the luminance of the first and/or second display(s) 1210 and/or 1215. For example, in case of the second angle 1230-3, the electronic device may set the luminance of the first display 1210 to about 120 cd and set the luminance of the second display 1215 to about 40 cd.

According to an embodiment, if the angle is the third angle 1230-5 (e.g., greater than about 30 degrees), the electronic device may change the luminance of the first and/or second display(s) 1210 and/or 1215. For example, in case of the third angle 1230-5, the electronic device may turn on both the first and second displays 1210 and 1215. Also, the electronic device may set the luminance of the first and second displays 1210 and 1215 to about 140 cd.

According to an embodiment, a method performed by the electronic device may include identifying the number of one or more displays functionally connected with the electronic device; if the number of one or more displays is singular, executing at least part of one or more functions of the one or more displays in a first power consumption mode; and if the number of one or more displays is plural, executing at least part of one or more functions of the one or more displays in a second power consumption mode.

According to an embodiment, the executing in the second power consumption mode may include changing the number of or a speed of a core assigned to the one or more displays.

According to an embodiment, the executing in the second power consumption mode may include executing a low power consumption mode, based on an angle or a relative distance between the one or more displays.

According to an embodiment, the executing in the second power consumption mode may include executing a low power consumption mode, depending on a type of or combination of an application displayed through the one or more displays.

According to an embodiment, the executing in the second power consumption mode may include operating, in a low power consumption mode, a specific display irrelevant to a user's gaze among the one or more displays.

According to an embodiment, if another display is further functionally connected with the electronic device, the method may further include executing, in a low power consumption mode, at least one of the one or more displays and the further connected another display.

According to an embodiment, the executing in the second power consumption mode may include changing at least one of a size of and the number of a buffer associated with the one or more displays.

According to an embodiment, the executing in the second power consumption mode may include changing at least one of a touch rate of and an input standby time of the one or more displays, based on at least one of a resolution of the one or more displays and a type of an application displayed on the one or more displays.

According to an embodiment, the executing in the second power consumption mode may include changing at least one of luminance of and a frame rate of the one or more displays, based on an application displayed on the one or more displays.

According to an embodiment, an electronic device may include one or more displays; and a power control module functionally connected with the one or more displays, wherein the power control module is configured to execute at least part of one or more functions of the one or more displays in a first power consumption mode if the number of one or more displays is singular, and to execute at least part of one or more functions of the one or more displays in a second power consumption mode if the number of one or more displays is plural.

According to an embodiment, the one or more displays may be attachable to or detachable from the electronic device.

According to an embodiment, the power control module may be further configured to adjust luminance of the one or more displays, based on an application displayed through at least part of the one or more displays.

According to an embodiment, the power control module may be further configured to change a touch detection cycle of at least part of the one or more displays, based on at least one of a frequency of and a size of a touch input detected through the one or more displays.

According to an embodiment, the power control module may be further configured to change at least one of the number of and a speed of a core assigned to the one or more displays, depending on a type of or combination of an application displayed through the one or more displays.

According to an embodiment, the power control module may be further configured to change at least one of resolution, luminance, and a frame rate of the one or more displays, based on a current battery level of the electronic device.

According to an embodiment, the power control module may be further configured to operate the one or more displays in a first low power consumption mode when a current battery level is within a first range, and to operate the one or more displays in a second low power consumption mode when the current battery level is within a second range.

According to an embodiment, the power control module may be further configured to turn on or off the one or more displays, based on an angle or a relative distance between the one or more displays.

According to an embodiment, the power control module may be further configured to change an application displayed on the one or more displays, based on an angle or a relative distance between the one or more displays.

According to an embodiment, the power control module may be further configured to change electric power supplied to the one or more displays, based on a touch input time of the one or more displays.

As fully discussed hereinbefore, the electronic device and method disclosed herein may have the ability to reduce power consumption and thereby allow end-users to effectively use the electronic device having several displays functionally connected thereto.

According to various embodiments, at least part of the electronic device or the method according to the present disclosure may be implemented by a command stored in a non-transitory computer-readable storage medium in a programming module form. When the command is executed by one or more processors, the one or more processors may execute a function corresponding to the command. The non-transitory computer-readable storage medium may be, for example, a memory unit or a storage unit. At least a part of the programming module may be implemented (e.g., executed) by, for example, the processor. At least a part of the programming module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (e.g., e.g., programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or programming module according to this disclosure may include or exclude at least one of the above-discussed elements or further include any other element. The operations performed by the module, programming module or any other element according to this disclosure may be executed sequentially, in parallel, repeatedly, or by a heuristic method. Additionally, some operations may be executed in different orders or omitted, or any other operation may be added.

According to various embodiment, a computer-readable storage medium may record thereon a program for executing operations of identifying the number of one or more displays functionally connected with an electronic device; if the number of one or more displays is singular, executing at least part of one or more functions of the one or more displays in a first power consumption mode; and if the number of one or more displays is plural, executing at least part of one or more functions of the one or more displays in a second power consumption mode.

While this disclosure has been particularly shown and described with reference to an exemplary embodiment thereof, it will be understood by those skilled in the art that various changes in form and details may be made therein without departing from the spirit and scope of this disclosure as defined by the appended claims.

What is claimed is:

1. A method performed by an electronic device, comprising:

identifying a number of displays that are functionally connected with the electronic device; and selecting one of two power function modes for executing functions of the displays that are functionally connected with the electronic device based on the number, wherein:

the selected power function mode is a first power consumption mode when the number is one, and the selected power function mode is a second power consumption mode having a lower power consumption than in the first power consumption mode when the number is greater than one, wherein the executing in the second power consumption mode includes changing a number of cores or a speed of a core assigned to the functionally connected plural displays.

2. The method of claim 1, wherein the executing in the second power consumption mode includes executing a low power consumption mode, based on an angle or a relative distance between the functionally connected plural displays.

3. The method of claim 1, wherein the executing in the second power consumption mode includes executing a low power consumption mode, depending on a type of application or combination of applications displayed through the functionally connected plural displays.

4. The method of claim 1, wherein the executing in the second power consumption mode includes operating, in a low power consumption mode, a specific display irrelevant to a user's gaze among the functionally connected plural displays.

5. The method of claim 1, further comprising:

identifying another display as functionally connected with the electronic device; and executing, in a low power consumption mode, at least one of the number of functionally connected displays and the another display.

6. The method of claim 1, wherein the executing in the second power consumption mode includes changing at least one of a touch rate of and an input standby time of the functionally connected plural displays, based on at least one of a resolution of the functionally connected plural displays and a type of an application displayed on the functionally connected plural displays.

7. The method of claim 1, wherein the executing in the second power consumption mode includes changing at least one of luminance of and a frame rate of the functionally connected plural displays, based on an application displayed on the functionally connected plural displays.

8. A method performed by an electronic device, comprising:

identifying a number of displays that are functionally connected with the electronic device; and selecting one of two power function modes for executing functions of the displays that are functionally connected with the electronic device based on the number, wherein:

the selected power function mode is a first power consumption mode when the number is one, and the selected power function mode is a second power consumption mode having a lower power consumption than in the first power consumption mode when the number is greater than one, wherein the executing in the second power consumption mode includes changing at least one of a size of and a number of buffers associated with the functionally connected plural displays.

9. An electronic device comprising:

one or more displays; and a power control module functionally connected with the one or more displays, wherein the power control module is configured to:

identify a number of displays that are functionally connected with the electronic device;

when the number is singular, execute at least part of one or more functions of the functionally connected single display in a first power consumption mode, and when the number is plural, execute at least part of one or more functions of the functionally connected plural displays in a second power consumption mode having smaller current consumption than in the first power consumption mode, wherein the power control module is further configured to change a touch detection cycle of at least part of the functionally connected plural displays, based on at least one of a frequency of and a size of a touch input detected through the functionally connected plural displays.

10. The electronic device of claim 9, wherein the one or more displays are attachable to or detachable from the electronic device.

11. The electronic device of claim 9, wherein the power control module is further configured to adjust luminance of the functionally connected plural displays, based on an application displayed through at least part of the functionally connected plural displays.

12. The electronic device of claim 9, wherein the power control module is further configured to change at least one of a number of cores and a speed of a core assigned to the functionally connected plural displays, depending on a type of application or combination of applications displayed through the functionally connected plural displays.

13. The electronic device of claim 9, wherein the power control module is further configured to change at least one of resolution, luminance, and a frame rate of the functionally connected plural displays, based on a current battery level of the electronic device.

14. The electronic device of claim 9, wherein the power control module is further configured to operate the functionally connected single display in the first power consumption mode when a current battery level is within a first range, and to operate the functionally connected plural displays in the second power consumption mode when the current battery level is within a second range.

15. The electronic device of claim 9, wherein the power control module is further configured to turn on or off each of the functionally connected plural displays, based on an angle or a relative distance between the functionally connected plural displays.

16. The electronic device of claim 9, wherein the power control module is further configured to change an application displayed on the functionally connected plural displays, based on an angle or a relative distance between the functionally connected plural displays.

17. The electronic device of claim 9, wherein the power control module is further configured to change electric power supplied to the functionally connected plural displays, based on a touch input time of the functionally connected plural displays.

18. A non-transitory computer-readable storage medium recording thereon a program for executing operations of:

identifying a number of displays that are functionally connected with an electronic device; and selecting one of two power function modes for executing functions of the displays that are functionally connected with the electronic device based on the number, wherein:

the selected power function mode is a first power consumption mode when the number is one, and the selected power function mode is a second power consumption mode having a lower power consumption than in the first power consumption mode when the number is greater than one, wherein the executing in the second power consumption mode includes changing a number of cores or a speed of a core assigned to the functionally connected plural displays.

* * * * *